United States Patent
Hedayat

(10) Patent No.: US 10,892,804 B2
(45) Date of Patent: *Jan. 12, 2021

(54) METHODS FOR UPLINK MULTIUSER SIGNALING AND TRANSMISSION

(71) Applicant: NEWRACOM, Inc., Lake Forest, CA (US)

(72) Inventor: Ahmad Reza Hedayat, Aliso Viejo, CA (US)

(73) Assignee: NEWRACOM, INC., Lake Forest, CA (US)

( * ) Notice: Subject to any disclaimer, the term of this patent is extended or adjusted under 35 U.S.C. 154(b) by 99 days.

This patent is subject to a terminal disclaimer.

(21) Appl. No.: 16/145,732

(22) Filed: Sep. 28, 2018

(65) Prior Publication Data

US 2019/0036575 A1 Jan. 31, 2019

Related U.S. Application Data

(63) Continuation of application No. 15/171,870, filed on Jun. 2, 2016, now Pat. No. 10,116,361.

(Continued)

(51) Int. Cl.
*H04B 7/0452* (2017.01)
*H04W 74/00* (2009.01)
(Continued)

(52) U.S. Cl.
CPC ......... *H04B 7/0452* (2013.01); *H04B 7/0404* (2013.01); *H04W 74/006* (2013.01); *H04W 84/12* (2013.01)

(58) Field of Classification Search
CPC combination set(s) only.
See application file for complete search history.

(56) References Cited

U.S. PATENT DOCUMENTS 9,854,606 B2 * 12/2017 Seok ............... H04W 74/04
9,985,739 B2 5/2018 Seok et al.
(Continued)

OTHER PUBLICATIONS

IEEE P802.11ah/D5.0: "Part 11: Wireless LAN Medium Access Control (MAC) and Physical Layer (PHY) Specifications, Amendment 2: Sub 1 GHz License Exempt Operation," IEEE Draft Standard for Information technology—Telecommunications and information exchange between systems, Local and metropolitan area networks— Specific requirements, Mar. 2015, 632 pages.

(Continued)

*Primary Examiner* — Xavier S Wong
(74) *Attorney, Agent, or Firm* — Nicholson De Vos Webster & Elliott LLP

(57) ABSTRACT

A method implemented by an Access Point (AP) in a Wireless Local Area Network (WLAN) to initiate an uplink (UL) multi-user (MU) simultaneous transmission. The method includes generating a trigger frame that initiates the UL MU simultaneous transmission, where the trigger frame includes (1) a UL MU Physical Layer Convergence Protocol (PLCP) Protocol Data Unit (PPDU) attributes field to indicate attributes pertaining to a UL MU PPDU transmitted to the AP during the UL MU simultaneous transmission that are common to a plurality of stations (STAs) that are scheduled to participate in the UL MU simultaneous transmission and (2) a STA Physical Layer Service Data Unit (PSDU) attributes field for a particular STA from the plurality of STAs to indicate attributes pertaining to the UL MU PPDU that are specific to the particular STA. The method further includes transmitting the trigger frame through a wireless medium.

20 Claims, 9 Drawing Sheets

Related U.S. Application Data

(60) Provisional application No. 62/305,161, filed on Mar. 8, 2016, provisional application No. 62/240,423, filed on Oct. 12, 2015, provisional application No. 62/191,628, filed on Jul. 13, 2015, provisional application No. 62/170,012, filed on Jun. 2, 2015.

(51) Int. Cl.
*H04B 7/0404* (2017.01)
*H04W 84/12* (2009.01)

(56) References Cited

U.S. PATENT DOCUMENTS

| | | | | |
|---|---|---|---|---|
| 10,181,930 | B2* | 1/2019 | Hedayat | H04W 72/1289 |
| 10,305,647 | B2* | 5/2019 | Seok | H04W 72/0413 |
| 10,470,176 | B2* | 11/2019 | Merlin | H04W 74/0816 |
| 2013/0301551 | A1* | 11/2013 | Ghosh | H04B 7/066 370/329 |
| 2014/0247824 | A1 | 9/2014 | Sohn, III et al. | |
| 2016/0227565 | A1* | 8/2016 | Ghosh | H04W 74/006 |
| 2016/0345349 | A1* | 11/2016 | Ferdowsi | H04W 72/1268 |
| 2017/0288748 | A1 | 10/2017 | Lou et al. | |
| 2017/0303280 | A1* | 10/2017 | Chun | H04L 1/1614 |
| 2018/0041917 | A1* | 2/2018 | Xi | H04W 72/121 |

OTHER PUBLICATIONS

IEEE Std 802.11-2012: "Part 11: Wireless LAN Medium Access Control (MAC) and Physical Layer (PHY) Specifications," IEEE Standard for Information technology—Telecommunications and information exchange between systems, Local and metropolitan area networks—Specific requirements, Mar. 29, 2012, 2793 pages.
IEEE Std 802.11ac-2013 "Part 11: Wireless LAN Medium Access Control (MAC) and Physical Layer (PHY) Specifications, Amendment 4: Enhancements for Very High Throughput for Operation in Bands below 6 GHz," IEEE Standard for Information technology—Telecommunications and information exchange between systems, Local and metropolitan area networks—Specific requirements, Dec. 18, 2013, 425 pages.
Non-Final Office Action from U.S. Appl. No. 15/171,870, dated Feb. 5, 2018, 16 pages.
Notice of Allowance from U.S. Appl. No. 15/171,870, dated Jul. 2, 2018, 11 pages.

* cited by examiner

METHODS FOR UPLINK MULTIUSER SIGNALING AND TRANSMISSION

CROSS-REFERENCE TO RELATED APPLICATIONS

This application is a continuation of U.S. application Ser. No. 15/171,870 filed Jun. 2, 2016 (now U.S. Pat. No. 10,116,361 issued Oct. 30, 2018), which claims the benefit of U.S. Provisional Application No. 62/170,012 filed Jun. 2, 2015, U.S. Provisional Application No. 62/191,628 filed Jul. 13, 2015, U.S. Provisional Application No. 62/240,423 filed Oct. 12, 2015, and U.S. Provisional Application No. 62/305,161 filed Mar. 8, 2016 which are hereby incorporated by reference.

FIELD OF INVENTION

The embodiments are related to the field of Wireless Local Area Network (WLAN) operation. More specifically, the embodiments relate to a method and apparatus for initiating an uplink (UL) multi-user (MU) simultaneous transmission in a WLAN. Other embodiments are also disclosed.

BACKGROUND

Institute of Electrical and Electronics Engineers (IEEE) 802.11 is a set of physical and Media Access Control (MAC) specifications for implementing wireless local area network (WLAN) communications. These specifications provide the basis for wireless network products using the Wi-Fi brand managed and defined by the Wi-Fi Alliance. The specifications define the use of the 2.400-2.500 GHz as well as the 4.915-5.825 GHz bands. These spectrum bands are commonly referred to as the 2.4 GHz and 5 GHz bands. Each spectrum is subdivided into channels with a center frequency and bandwidth. The 2.4 GHz band is divided into 14 channels spaced 5 MHz apart, though some countries regulate the availability of these channels. The 5 GHz band is more heavily regulated than the 2.4 GHz band and the spacing of channels varies across the spectrum with a minimum of a 5 MHz spacing dependent on the regulations of the respective country or territory.

WLAN devices are currently being deployed in diverse environments. These environments are characterized by the existence of many Access Points (APs) and non-AP stations (STAs) in geographically limited areas. Increased interference from neighboring devices gives rise to performance degradation. Additionally, WLAN devices are increasingly required to support a variety of applications such as video, cloud access, and offloading. Video traffic, in particular, is expected to be the dominant type of traffic in WLAN deployments. With the real-time requirements of some of these applications, WLAN users demand improved performance.

In a task group called Institute of Electrical and Electronics Engineers (IEEE) 802.11ax, High Efficiency WLAN (HEW) standardization is under discussion. The HEW aims at improving performance felt by users demanding high-capacity and high-rate services. The HEW may support uplink (UL) multi-user (MU) simultaneous transmission, which includes uplink Multi-User Multiple-Input Multiple-Output (MU-MIMO) and uplink Orthogonal Frequency Division Multiple Access (OFDMA) transmissions.

SUMMARY

The embodiments provide a method implemented by an Access Point (AP) in a Wireless Local Area Network (WLAN) to initiate an uplink (UL) multi-user (MU) simultaneous transmission. The method includes generating a trigger frame that initiates the UL MU simultaneous transmission, where the trigger frame includes (1) a UL MU Physical Layer Convergence Protocol (PLCP) Protocol Data Unit (PPDU) attributes field to indicate attributes pertaining to a UL MU PPDU transmitted to the AP during the UL MU simultaneous transmission that are common to a plurality of stations (STAs) that are scheduled to participate in the UL MU simultaneous transmission and (2) a STA Physical Layer Service Data Unit (PSDU) attributes field for a particular STA from the plurality of STAs to indicate attributes pertaining to the UL MU PPDU that are specific to the particular STA. The method further includes transmitting the response frame to the unassociated STA through a wireless medium.

The embodiments provide a network device to function as an Access Point (AP) in a Wireless Local Area Network (WLAN) to initiate an uplink (UL) multi-user (MU) simultaneous transmission. The network device includes a Radio Frequency (RF) transceiver, a set of one or more processors, and a non-transitory machine-readable medium having stored therein a UL MU simultaneous transmission module, which when executed by the set of one or more processors, causes the network device to generate a trigger frame that initiates the UL MU simultaneous transmission, where the trigger frame includes (1) a UL MU Physical Layer Convergence Protocol (PLCP) Protocol Data Unit (PPDU) attributes field to indicate attributes pertaining to a UL MU PPDU transmitted to the AP during the UL MU simultaneous transmission that are common to a plurality of STAs that are scheduled to participate in the UL MU simultaneous transmission and (2) a STA Physical Layer Service Data Unit (PSDU) attributes field for a particular STA from the plurality of STAs to indicate attributes pertaining to the UL MU PPDU that are specific to the particular STA. The UL MU simultaneous transmission module, when executed by the network device, further causes the network device to transmit the trigger frame through a wireless medium.

The embodiments provide a non-transitory machine-readable storage medium having computer code stored therein that is to be executed by a set of one or more processors of a network device functioning as an Access Point (AP) in a Wireless Local Area Network (WLAN) to initiate an uplink (UL) multi-user (MU) simultaneous transmission. The computer code, when executed by the network device, causes the network device to generate a trigger frame that initiates the UL MU simultaneous transmission, where the trigger frame includes (1) a UL MU Physical Layer Convergence Protocol (PLCP) Protocol Data Unit (PPDU) attributes field to indicate attributes pertaining to a UL MU PPDU transmitted to the AP during the UL MU simultaneous transmission that are common to a plurality of STAs that are scheduled to participate in the UL MU simultaneous transmission and (2) a STA Physical Layer Service Data Unit (PSDU) attributes field for a particular STA from the plurality of STAs to indicate attributes pertaining to the UL MU PPDU that are specific to the particular STA. The computer code, when executed by the network device, further causes the network device to transmit the trigger frame through a wireless medium.

The embodiments provide a method implemented by a station (STA) in a Wireless Local Area Network (WLAN) to participate in an uplink (UL) multi-user (MU) simultaneous transmission to an access point (AP) with one or more other STAs. The method includes receiving a trigger frame that initiates the UL MU simultaneous transmission from the AP, where the trigger frame includes (1) a UL MU Physical Layer Convergence Protocol (PLCP) Protocol Data Unit (PPDU) attributes field to indicate attributes pertaining to a UL MU PPDU transmitted to the AP during the UL MU simultaneous transmission that are common to the STA and the one or more other STAs and (2) a STA Physical Layer Service Data Unit (PSDU) attributes field for the STA to indicate attributes pertaining to the UL MU PPDU that are specific to the STA. The method further includes transmitting the UL MU PPDU to the AP through a wireless medium during the UL MU simultaneous transmission, according to the attributes pertaining to the UL MU PPDU indicated in the UL MU PPDU attributes field and the STA PSDU attributes field for the STA.

The embodiments provide a network device to function as a station (STA) in a Wireless Local Area Network (WLAN) to participate in an uplink (UL) multi-user (MU) simultaneous transmission to an access point (AP) with one or more other STAs. The network device includes a Radio Frequency (RF) transceiver, a set of one or more processors, and a non-transitory machine-readable medium having stored therein a UL MU simultaneous transmission module, which when executed by the set of one or more processors, causes the network device to receive a trigger frame that initiates the UL MU simultaneous transmission from the AP, where the trigger frame includes (1) a UL MU Physical Layer Convergence Protocol (PLCP) Protocol Data Unit (PPDU) attributes field to indicate attributes pertaining to a UL MU PPDU transmitted to the AP during the UL MU simultaneous transmission that are common to the STA and the one or more other STAs and (2) a STA Physical Layer Service Data Unit (PSDU) attributes field for the STA to indicate attributes pertaining to the UL MU PPDU that are specific to the STA. The UL MU simultaneous transmission module, when executed by the network device, further causes the network device to transmit the UL MU PPDU to the AP through a wireless medium during the UL MU simultaneous transmission, according to the attributes pertaining to the UL MU PPDU indicated in the UL MU PPDU attributes field and the STA PSDU attributes field for the STA.

The embodiments provide a non-transitory machine-readable storage medium having computer code stored therein that is to be executed by a set of one or more processors of a network device functioning as a station (STA) in a Wireless Local Area Network (WLAN) to participate in an uplink (UL) multi-user (MU) simultaneous transmission to an access point (AP) with one or more other STAs. The computer code, when executed by the network device, causes the network device to receive a trigger frame that initiates the UL MU simultaneous transmission from the AP, where the trigger frame includes (1) a UL MU Physical Layer Convergence Protocol (PLCP) Protocol Data Unit (PPDU) attributes field to indicate attributes pertaining to a UL MU PPDU transmitted to the AP during the UL MU simultaneous transmission that are common to the STA and the one or more other STAs and (2) a STA Physical Layer Service Data Unit (PSDU) attributes field for the STA to indicate attributes pertaining to the UL MU PPDU that are specific to the STA. The computer code, when executed by the network device, further causes the network device to transmit the UL MU PPDU to the AP through a wireless medium during the UL MU simultaneous transmission, according to the attributes pertaining to the UL MU PPDU indicated in the UL MU PPDU attributes field and the STA PSDU attributes field for the STA.

BRIEF DESCRIPTION OF THE DRAWINGS

Embodiments are illustrated by way of example, and not by way of limitation, in the figures of the accompanying drawings in which like references indicate similar elements. It should be noted that different references to "an" or "one" embodiment in this specification are not necessarily to the same embodiment, and such references mean at least one. Further, when a particular feature, structure, or characteristic is described in connection with an embodiment, it is submitted that it is within the knowledge of one skilled in the art to affect such feature, structure, or characteristic in connection with other embodiments whether or not explicitly described.

DETAILED DESCRIPTION

Figure 1:
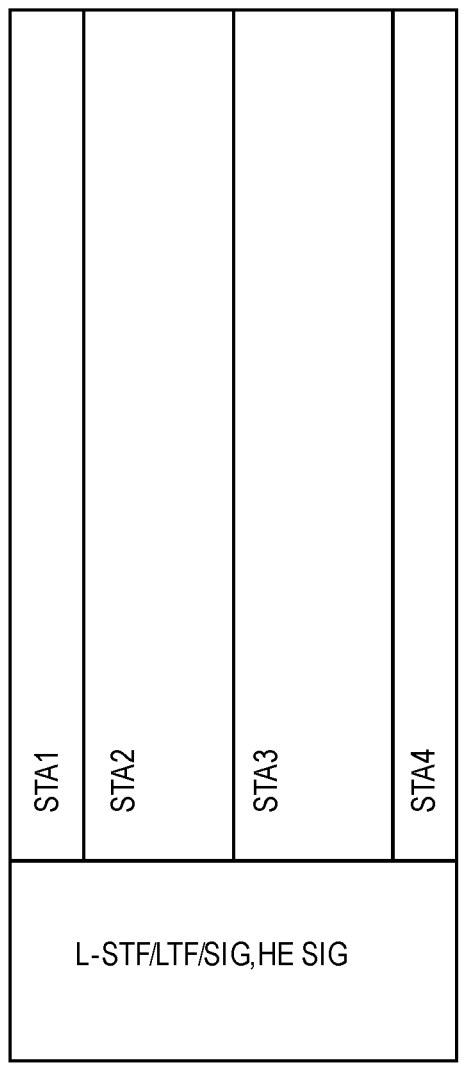
FIG. 1 is a diagram illustrating operations of a UL MU simultaneous transmission, according to some embodiments.
Figure 1:

The embodiments disclosed herein provide a method and apparatus for initiating an uplink (UL) multi-user (MU) simultaneous transmission in a Wireless Local Area Network (WLAN). An embodiment is a method implemented by an access point (AP) that generates a trigger frame to initiate a UL MU simultaneous transmission, where the trigger frame includes a UL MU Physical Layer Convergence Protocol (PLCP) Protocol Data Unit (PPDU) attributes field to indicate attributes pertaining to a UL MU PPDU transmitted to the AP during the UL MU simultaneous transmission that are common to a plurality of STAs that are scheduled to participate in the UL MU simultaneous transmission and a STA Physical Layer Service Data Unit (PSDU) attributes field for a particular STA from the plurality of STAs to indicate attributes pertaining to the UL MU PPDU that are specific to the particular STA. The AP then transmits the trigger frame through a wireless medium. Other embodiments are also described and claimed.

In the following description, numerous specific details are set forth. However, it is understood that embodiments may be practiced without these specific details. In other instances, well-known circuits, structures and techniques have not been shown in detail in order not to obscure the understanding of this description. It will be appreciated, however, by one skilled in the art that embodiments may be practiced without such specific details. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein refers to any positive whole number of items including one item.

An electronic device stores and transmits (internally and/or with other electronic devices over a network) code (which is composed of software instructions and which is sometimes referred to as computer program code or a computer program) and/or data using machine-readable media (also called computer-readable media), such as non-transitory machine-readable media (e.g., machine-readable storage media such as magnetic disks, optical disks, read only memory, flash memory devices, phase change memory) and transitory machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more non-transitory machine-readable storage media (to store code for execution on the set of processors and data) and a set of one or more physical network interface(s) to establish network connections (to transmit code and/or data using propagating signals). Put another way, a typical electronic device includes memory comprising non-volatile memory (containing code regardless of whether the electronic device is on or off) and volatile memory (e.g., dynamic random access memory (DRAM), static random access memory (SRAM)), and while the electronic device is turned on that part of the code that is currently being executed is copied from the slower non-volatile memory into the volatile memory (often organized in a hierarchy) for execution by the processors of the electronic device.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video). Network devices or network elements can include APs and non-AP STAs in wireless communications systems such as a WLAN. STAs are devices connected to and communicating in a WLAN including client or user devices that connect to the WLAN via APs. APs are network devices that may be specialized wireless access points that can communicate with other network devices in the WLAN via the wireless medium or via wired connections. A STA or AP may be referred to herein as a WLAN device.

In a task group called Institute of Electrical and Electronics Engineers (IEEE) 802.11ax, High Efficiency WLAN (HEW) standardization is under discussion. The HEW aims at improving performance felt by users demanding high-capacity and high-rate services. The HEW may support UL MU (MU) simultaneous transmission, which includes UL MU Multiple-Input Multiple-Output (MU-MIMO) and UL Orthogonal Frequency Division Multiple Access (OFDMA) transmissions.

Typically, an AP initiates a UL MU simultaneous transmission by transmitting a trigger frame (sometimes referred to as a UL-Poll frame) to a set of STAs that are to participate in the UL MU simultaneous transmission. The trigger frame may serve various purposes. One purpose of the trigger frame is to provide a reference to the STAs that are to participate in the UL MU simultaneous transmission in terms of time. Another purpose of the trigger frame is to provide information pertaining to the UL MU simultaneous transmission such as a list of STAs that are to participate in the UL MU simultaneous transmission, the assignment of transmission resources to STAs, and other physical layer (PHY) attributes and media access control (MAC) layer attributes pertaining to the UL MU simultaneous transmission that the STAs that are to participate in the UL MU simultaneous transmission may need to know to properly transmit their respective payloads to the AP during the UL MU simultaneous transmission. In response to receiving the trigger frame, the STAs that participate in the UL MU simultaneous transmission transmit their respective payloads simultaneously to the AP during the UL MU simultaneous transmission according to the information indicated in the trigger frame (e.g., using an assigned transmission resource), in the form of a UL MU PPDU.

The present disclosure defines various fields (and sub-fields thereof) that may be included in a trigger frame that initiates a UL MU simultaneous transmission. An AP may set the values in these fields of the trigger frame to convey various attributes pertaining to the UL MU PPDU that is to be transmitted by the STAs that participate in the UL MU simultaneous transmission. The AP may then transmit the trigger frame to the STAs that are to participate in the UL MU simultaneous transmission. The STAs that receive the trigger frame may determine how to properly form the UL MU PPDU based on the attributes pertaining to the UL MU PPDU indicated in the trigger frame.

As will be described in additional detail below, in one embodiment, a trigger frame that initiates a UL MU simultaneous transmission includes a UL MU PPDU attributes field. The UL MU PPDU attributes field (also referred to herein as "common info field") is used to indicate attributes pertaining to the UL MU PPDU that are common to all the STAs that are scheduled to participate in the UL MU simultaneous transmission. In one embodiment, the trigger frame also includes one or more STA PSDU attributes fields. Each of the one or more STA PSDU attributes fields (also referred to herein as "per-user info field") is used to indicate attributes pertaining to the UL MU PPDU that are specific to a particular STA from the STAs that are scheduled to participate in the UL MU simultaneous transmission. In one embodiment, a trigger frame may include a single UL MU PPDU attributes field and multiple STA PSDU attributes field (e.g., one STA PSDU attributes field for each STA that is scheduled to participate in the UL MU simultaneous transmission or a subset thereof).

FIG. 1 is a diagram illustrating operations of a UL MU simultaneous transmission, according to some embodiments. For sake of clarity and ease of understanding, the operations are described in the context of a WLAN that includes an AP and at least four STAs (e.g., STA1, STA2, STA3, and STA4). It should be understood, however, that the embodiments described herein are not limited to this context. In the diagram, the horizontal dimension represents the time dimension (or number of Orthogonal Frequency-Division Multiplexing (OFDM) symbols), while the vertical dimension represents the frequency dimension (or number of tones or number of subcarriers). The AP may initiate a UL MU simultaneous transmission by transmitting a trigger frame in a unicast/multicast/broadcast manner such that all of the intended participants of the UL MU simultaneous transmission can receive and decode the trigger frame. In this example, the intended participants of the UL MU simultaneous transmission are STA1, STA2, STA3, and STA4. Although shown as a single trigger frame transmitted in a PPDU, in other embodiments, the PPDU may include multiple trigger frames that collectively schedule the UL MU transmission. For the sake of simplicity, a PPDU carrying a single trigger frame will be described hereinafter. After a predetermined time (e.g., Short Interframe Space (SIFS) time) from receiving the trigger frame (or the PPDU carrying the trigger frame), the STAs that participate in the upcoming UL MU simultaneous transmission simultaneously transmit a preamble followed by their respective payloads to the AP during the UL MU simultaneous transmission, which forms a UL MU PPDU. The preamble may include symbols such as legacy short training field (L-STF), legacy long training field (L-LTF), legacy signal field (L-SIG), and High Efficiency signal field (HE SIG). Each STA transmits its payload during the UL MU simultaneous transmission using a transmission resource (e.g., a transmission resource unit) assigned to itself (e.g., the assignment of transmission resources to STAs may be indicated in the trigger frame). The payload of each STA may be transmitted in a PSDU. In this example, STA1 transmits its payload using a first transmission resource (or the transmission resource identified within the first per-user info field), STA2 transmits its payload using a second transmission resource, STA3 transmits its payload using a third transmission resource, and STA4 transmits its payload using a fourth transmission resource.

In one embodiment, a trigger frame that initiates a UL MU simultaneous transmission includes a UL MU PPDU attributes field. The UL MU PPDU attributes field is used to indicate attributes pertaining to a UL MU PPDU that is to be transmitted to the AP during the UL MU simultaneous transmission that are common to all the STAs that are scheduled to participate in the UL MU simultaneous transmission. These attributes may be referred to herein as UL MU PPDU attributes. In one embodiment, the trigger frame also includes one or more STA PSDU attributes fields. Each STA PSDU attributes field is used to indicate attributes pertaining to the UL MU PPDU that are specific to a particular STA that is scheduled to participate in the UL MU simultaneous transmission. These attributes may be referred to herein as STA PSDU attributes. In one embodiment, a trigger frame may include a single UL MU PPDU attributes field and multiple STA PSDU attributes field (e.g., one STA PSDU attributes field for each STA that is scheduled to participate in the UL MU simultaneous transmission or a subset thereof). In one embodiment, the UL MU PPDU attributes field and each of the STA PSDU attributes fields have variable length, but there may be a fixed maximum length for each field. In one embodiment, one or more subfields of the UL MU PPDU attributes field and/or a STA PSDU attributes field may not be present depending on the value in one or more of the other subfields.

The UL MU PPDU attributes field may include one or more subfields such as a persistent trigger subfield, a bandwidth subfield, a MU PPDU type subfield, a guard interval subfield, a duration subfield, a group identifier subfield, an access category subfield, an access category restriction subfield, a padding subfield, and a P matrix size subfield. An AP may set the values in these subfields to convey various attributes pertaining to the UL MU PPDU that are common to all the STAs that are scheduled to participate in the UL MU simultaneous transmission. The structure and interpretation of these subfields are further described herein below.

The persistent trigger subfield of the UL MU PPDU attributes field may be used to indicate whether one or more of the attributes pertaining to the UL MU PPDU is the same as indicated in a previously transmitted trigger frame. In one embodiment, the length of the persistent trigger subfield is one bit, where a first state of the bit (e.g., "1" or TRUE value) indicates that the UL MU PPDU attributes are the same as indicated in the preceding trigger frame and a second state of the bit (e.g., "0" or FALSE value) indicates that the UL MU PPDU attributes are not the same as indicated in the preceding trigger frame. In the case that the bit is set to the first state (which indicates that the UL MU PPDU attributes are the same as indicated in the preceding trigger frame), some of the other subfields of the UL MU PPDU attributes field may not be present in the UL MU PPDU attributes field. In the case that the bit is set to the second state (which indicates that the UL MU PPDU attributes are not the same as indicated in the preceding trigger frame), all of the subfields of the UL MU PPDU attributes field may be present in the UL MU PPDU attributes field. In one embodiment, the length of the persistent trigger subfield is more than one bit. In this case, the value in the persistent trigger subfield serves as an identifier that identifies a previously transmitted trigger frame. In one embodiment, if the value in the persistent trigger subfield of a trigger frame is set to a value that has appeared in the persistent trigger subfield of a previous trigger frame during the current transmission opportunity (TXOP), then this indicates that some or all of the UL MU PPDU attributes are the same as indicated in the previous trigger frame. In this case, some of the subfields of the UL MU PPDU attributes field may not be present in the trigger frame. In one embodiment, if the value in the persistent trigger subfield is set to a value that has not appeared in the persistent trigger subfield of any previous trigger frame during the current TXOP, then this indicates that the UL MU PPDU attributes are not the same as indicated in any previous trigger frame. In this case, all of the subfields of the UL MU PPDU attributes filed may be present in the trigger frame. As mentioned above, in one embodiment, if the value in the persistent trigger subfield is set to the first state or is set to a value that has appeared in the persistent trigger subfield of a previous trigger frame during the current TXOP, then one or more of the subfields of the UL MU PPDU attributes field may not be present in the trigger frame. However, in some embodiments, some subfields of the UL MU PPDU attributes field that happen to be located within the same byte-boundary as the persistent trigger subfield may be present. For example, in one embodiment, the bandwidth subfield and UL MU PPDU type subfield may be within the same byte-boundary as the persistent trigger subfield, and thus these subfields may appear in the UL MU PPDU attributes field even when they are not needed. In one embodiment, the bandwidth subfield, UL MU PPDU type subfield, and duration subfield may be within the same byte-boundary as the persistent trigger subfield, and thus these subfields may appear in the UL MU PPDU attributes field even when they are not needed. In one embodiment, if the value in the persistent trigger subfield is set to the first state (e.g., set to "1" or TRUE value) or is set to a value that has appeared in the persistent trigger subfield of a previous trigger frame during the current TXOP, then this indicates that the STA PSDU attributes are the same as indicated in the immediately preceding trigger frame or the indicated previous trigger frame. In this case, a STA PSDU attributes field may not be present in the trigger frame.

The bandwidth subfield of the UL MU PPDU attributes field is used to indicate a bandwidth of the UL MU PPDU. For instance, this subfield could indicate that the upcoming UL MU PPDU is a 20 MHz, 40 MHz, 80 MHz, 80+80 MHz, or 160 MHz PPDU.

The MU PPDU type subfield of the UL MU PPDU attributes field is used to indicate whether the UL MU PPDU is a UL MU MIMO PPDU.

The guard interval subfield of the UL MU PPDU attributes field is used to indicate a guard interval (GI) or cyclic prefix (CP) that the STAs that participate in the UL MU simultaneous transmission are to apply to one or more portions of the UL MU PPDU.

The duration subfield of the UL MU PPDU attributes field is used to indicate the length of the UL MU PPDU.

The group identifier subfield of the UL MU PPDU attributes field is used to indicate a group identifier that associates a group of the STAs that participate in the UL MU simultaneous transmission to form the UL MU PPDU.

The access category subfield of the UL MU PPDU attributes field is used to indicate an allowed access category for data included in the UL MU PPDU, or the access category that the AP used the associated Enhanced Distributed Channel Access (EDCA) contention parameters to access the medium with. The allowed access category for data included in the UL MU PPDU is a category/type of data that is allowed to be transmitted in the UL MU PPDU. In one embodiment, the value in the access category subfield indicates that the allowed access category is voice (VO), video (VI), background (BK), or best effort (BE).

The access category restriction subfield of the UL MU PPDU attributes field is used to indicate whether all of the STAs that participate in the UL MU simultaneous transmission to form the UL MU PPDU are to abide by the same access category setting indicated in the access category subfield. In one embodiment, the access category restriction subfield is used to indicate that the STAs are restricted to transmitting data in the UL MU PPDU that belongs to the same access category as indicated in the access category subfield or that belongs to an access category that has a higher priority.

The padding subfield of the UL MU PPDU attributes field is used to indicate whether the STAs that participate in the UL MU simultaneous transmission to form the UL MU PPDU are to apply padding to the UL MU PPDU. In one embodiment, if the value in the padding subfield is set to a first value (e.g., "1" or TRUE value), then this indicates that the STAs that form the UL MU PPDU are to apply a padding procedure to pad the UL MU PPDU. However, if the value in the padding subfield is set to a second value (e.g., "0" or FALSE value), then this indicates that the STAs that form the UL MU PPDU may or may not apply a padding procedure to pad the UL MU PPDU (i.e., padding may be optional). In one embodiment, the value in the padding subfield indicates a padding setting for each sub-channel. For example, the value in the padding subfield may indicate a separate padding setting for each 20 MHz sub-channel. In one embodiment, if the value in the padding subfield for a particular sub-channel indicates that padding is to be applied for that particular sub-channel, then this indicates that all of the STAs that are assigned a transmission resource in that particular sub-channel are to apply a padding procedure to pad the UL MU PPDU. However, if the value in the padding subfield for a particular sub-channel indicates that padding is optional for that particular sub-channel, then this indicates that all of the STAs that are assigned a transmission resource in that particular sub-channel may or may not apply a padding procedure to pad the UL MU PPDU (i.e., padding may be optional).

The P matrix size subfield of the UL MU PPDU attributes field is used to indicate the size of a P matrix that the STAs that participate in the UL MU simultaneous transmission are to use to generate their respective set of HE LTF symbols in the UL MU PPDU. If the AP assigns a maximum of two spatial streams to one or more of the STAs that are identified in a Trigger frame, then the P matrix size is two and all the STAs identified in the Trigger frame use the square P matrix with size two to generate two LTF sequences for the UL MU PPDU. Therefore, identifying the P matrix size identifies the number of LTF sequences that all the STAs are going to generate and use in the UL MU PPDU. The UL MU PPDU attributes field may also have a Type subfield, where the sender of the trigger frame requests the recipients thereof to send a response frame with the specified type. In some embodiments, the Type subfield appears as the first subfield in the UL MU PPDU attributes field.

The STA PSDU attributes field for a particular STA may include one or more subfields such as a STA identifier subfield, a new assignment identification subfield, an assignment subfield, a modulation coding scheme (MCS) subfield, a number of spatial streams subfield, a padding subfield, and a P matrix rows subfield. An AP may set the values in these subfields to convey various attributes pertaining to the UL MU PPDU that are specific to the particular STA. The structure and interpretation of these subfields are further described herein below.

The STA identifier subfield of the STA PSDU attributes field for a particular STA is used to indicate an association identifier assigned to the particular STA. In one embodiment, the value in the STA identifier subfield is an association ID (AID), partial AID (PAID), or another form of AID/PAID.

The new assignment identification subfield of the STA PSDU attributes field for a particular STA is used to indicate whether the transmission resource assigned to the particular STA is the same as indicated in a previously transmitted trigger frame. In one embodiment, if the value in the new assignment identification subfield indicates that the transmission resource assigned to the particular STA is the same as indicated in a previously transmitted trigger frame, then some of the other subfields (e.g., assignment subfield) of the STA PSDU attributes field for the particular STA may not be present in the trigger frame. In one embodiment, if the value in the new assignment identification subfield indicates that the transmission resource assigned to the particular STA is not the same as indicated in a previously transmitted trigger frame, then all of the subfields of the STA PSDU attributes field for the particular STA may be present in the trigger frame.

The assignment subfield of the STA PSDU attributes field for a particular STA is used to indicate a transmission resource that the particular STA is to use to transmit a set of Media Access Control (MAC) Protocol Data Units (MPDUs) within the UL MU PPDU to the AP during the UL MU simultaneous transmission. In one embodiment, in the case that the UL MU PPDU is not a UL MU MIMO PPDU, the value in the assignment subfield indicates the sub-band index or set of indices that the particular STA is to use to transmit a set of MPDUs within the UL MU PPDU to the AP during the UL MU simultaneous transmission. In one embodiment, the value in the assignment subfield is a reserved value or may not be present if the UL MU PPDU is a UL MU MIMO PPDU.

The MCS subfield of the STA PSDU attributes field for a particular STA is used to indicate an MCS level that the particular STA is to use for one or more portions of the UL MU PPDU that is to be transmitted to the AP during the UL MU simultaneous transmission.

The number of spatial streams subfield of the STA PSDU attributes field for a particular STA is used to indicate the number of spatial streams that the particular STA is to use to transmit the UL MU PPDU to the AP during the UL MU simultaneous transmission. In an embodiment, the value in the number of spatial streams subfield along with the value in the P matrix rows subfield define the set of spatial streams assigned to a STA, where the value in the P matrix rows subfield identifies the starting spatial reuse index.

The padding subfield of the STA PSDU attributes field for a particular STA is used to indicate whether the particular STA is to apply padding to the UL MU PPDU. In one embodiment, if the value in the padding subfield is set to a first value (e.g., "1" or TRUE value), then this indicates that the particular STA is to apply a padding procedure to pad the UL MU PPDU. However, if the value in the padding attribute is set to a second value (e.g., "0" or FALSE value), then this indicates that the particular STA may or may not apply a padding procedure to pad the UL MU PPDU (padding is optional).

The P matrix rows subfield of the STA PSDU attributes field for a particular STA is used to indicate a set of rows of a P matrix that the particular STA is to use to generate a set of HE LTF symbols in the UL MU PPDU, as well as the set of spatial streams that the STA is to use. In one embodiment, the value in the P matrix rows subfield may indicate a single row of the P matrix that is assigned to the particular STA or indicate a set of rows of the P matrix (the size of which may be indicated in the P matrix size subfield of the UL MU PPDU attributes field) that the particular STA is to use to generate its set of HE LTF symbols. In one embodiment, the "P matrix rows" subfield and the "number of spatial streams" subfield collectively identify the spatial streams (SS) allocation that the AP assigns to a STA.

In one embodiment, the group identifier subfield and the persistent trigger subfield of a UL MU PPDU attributes field can share the same subfield (e.g., the subfield can serve as either a group identifier subfield or a persistent trigger subfield), where the value in the MU PPDU type subfield indicates the role of the subfield. For example, when the value in the MU PPDU type subfield indicates that the UL MU PPDU is a UL MU MIMO PPDU, then the shared subfield is interpreted as a group identifier subfield. When the value in the MU PPDU type subfield indicates that the UL MU PPDU is a UL MU OFDMA PPDU, then the shared subfield is interpreted as a persistent trigger subfield.

In one embodiment, the UL MU PPDU attributes field may include a map subfield. The length of the map subfield could be any number of bytes, depending on the number of STAs that are indicated in the trigger frame. In one embodiment, the value in the map subfield is a reserved value (or the map subfield is not included) in a trigger frame where the value in the persistent trigger subfield is a value that appears for the first time in a TXOP. In one embodiment, when the value in the persistent trigger subfield of a trigger frame is a value that appears for the second or more time in a TXOP, each bit in the map subfield indicates whether the STA whose STA PSDU attributes field appeared with the same order value as the bit order of that bit in the first trigger frame (where the value in the persistent trigger subfield was set to the same value as the value in the persistent trigger subfield of the current trigger frame) is assigned a transmission resource in the current trigger frame or not. If the bit is set to a first state (e.g., "0" or FALSE value), then this indicates that there is no STA PSDU attributes field for the STA represented by that bit in the current trigger frame. However, if the bit is set to a second state (e.g., "1" or TRUE value), then this indicates that there is a STA PSDU attributes field for the STA represented by that bit in the current trigger frame. For example, if a trigger frame includes an indication that eight STAs are to participate in the UL MU simultaneous transmission and the trigger frame includes a persistent trigger subfield with a value that has appeared for the first time in a TXOP, then the value in all bits in the map subfield (which has a length of 1 byte (or eight bits)) may have a reserved value. In a subsequent trigger frame, where the value in the persistent trigger subfield has the same value as the value in the persistent trigger subfield of the first trigger frame, the first bit of the map subfield indicates whether a STA PSDU attributes field for the STA whose STA PSDU attributes field appeared first in the first trigger frame is included in the subsequent trigger frame. Other bits of the map subfield can be interpreted in a similar fashion.

In one embodiment, the STA identifier subfield and the new assignment identification subfield of a STA PSDU attributes field have a total combined length of two bytes. In one embodiment, these two subfields are always present in a STA PSDU attributes field, but depending on the value in the new assignment identification subfield, other subfields of that STA PSDU attributes field may or may not present in that STA PSDU attributes field (e.g., according to the rules described above with reference to the new assignment identification subfield).

In one embodiment, the persistent trigger subfield of the UL MU PPDU attributes field has a length ranging between one to two bytes. In one embodiment, depending on the value in the persistent trigger subfield, other subfields of the UL MU PPDU attributes field may or may not be present in the UL MU PPDU attributes field (e.g., according to the rules described above with reference to the persistent trigger subfield).

In one embodiment, a trigger frame includes a single UL MU PPDU attributes field and two or more STA PSDU attributes fields, where the UL MU PPDU attributes field and the two or more STA PSDU attributes fields each include all of the subfields for that field. In one embodiment, a trigger frame includes a UL MU PPDU attributes field, where the UL MU PPDU attributes field only includes a subset of the subfields for a UL MU PPDU attributes field (e.g., persistent trigger subfield and one or more other subfields). In one embodiment, a trigger frame includes two or more STA PSDU attributes fields, where one of the STA PSDU attributes fields includes all of the subfields for a STA PSDU attributes field, and where another one of the STA PSDU attributes fields only includes a STA identifier subfield and a new assignment identification subfield. In one embodiment, a trigger frame includes a UL MU PPDU attributes field, where the UL MU PPDU attributes field includes all or a subset of the subfields for a UL MU PPDU attributes field, and where the value in the persistent trigger subfield of the UL MU PPDU attributes field indicates that the STA PSDU attributes are the same as indicated in the preceding trigger frame or previous trigger frame. In this case, the trigger frame may not include a STA PSDU attributes field.

In an embodiment where the length of the persistent trigger subfield is one bit, the following rules may apply. When an AP sets the value in the persistent trigger subfield of a UL MU PPDU attributes field to indicate that the UL MU PPDU attributes are not the same as indicated in the preceding trigger frame, then the AP should include all of the subfields for a UL MU PPDU attributes field in the UL MU PPDU attributes field and also include two or more STA PSDU attributes fields in the trigger frame, each including all of the subfields for a STA PSDU attributes field. An AP should not transmit a trigger frame with the value in the persistent trigger subfield of the UL MU PPDU attributes field set to indicate that the UL MU PPDU attributes are the same as indicated in the preceding trigger frame to a STA that does not have UL MU persistent capability (e.g., the capability to remember the UL MU PPDU attributes and STA PSDU attributes indicated in a previous trigger frame). An AP should not transmit a trigger frame with the value in the persistent trigger subfield of the UL MU PPDU attributes field set to indicate that the UL MU PPDU attributes are the same as indicated in the preceding trigger frame in the first trigger frame transmitted in a TXOP. A STA that has UL MU persistent capability that receives a first trigger frame with the value in the persistent trigger subfield of the UL MU PPDU attributes field set to indicate that the UL MU PPDU attributes are not the same as indicated in the preceding trigger frame and that includes a STA PSDU attributes field for the STA (e.g., the value in the STA identifier subfield of the STA PSDU attributes field identifies the STA) should store the UL MU PPDU attributes indicated in the UL MU PPDU attributes field and the STA PSDU attributes indicated in the STA PSDU attributes field for at least the remainder of the TXOP duration. If the STA subsequently receives a second trigger frame with the value in the persistent trigger subfield of the UL MU PPDU attributes field set to indicate that the UL MU PPDU attributes are the same as indicated in the preceding trigger frame, the STA should use the stored attributes to determine how to transmit the UL MU PPDU that follows the second trigger frame.

In an embodiment where the length of the persistent trigger subfield is more than one bit, the following rules may apply. When an AP sets the value in the persistent trigger subfield of a UL MU PPDU attributes field to a value that appears for the first time in a TXOP, then the AP should include all of the subfields for a UL MU PPDU attributes field in the UL MU PPDU attributes field and also include two or more STA PSDU attributes fields in the trigger frame, each including all of the subfields for a STA PSDU attributes field. When an AP transmits a trigger frame to a STA that does not have UL MU persistent capability, the AP should transmit the trigger frame with the value in the persistent trigger subfield set to a value different than the value in the persistent trigger subfield of any of the previous trigger frames transmitted in the TXOP. A STA that has UL MU persistent capability that receives a first trigger frame, where the value in the persistent trigger subfield of the UL MU PPDU attributes field is set to a value that appears for the first time in the TXOP and that includes a STA PSDU attributes field for the STA (e.g., the value in the STA identifier subfield of the STA PSDU attributes field identifies the STA), should store the UL MU PPDU attributes indicated in the UL MU PPDU attributes field and the STA PSDU attributes indicated in the STA PSDU attributes field for at least the remainder of the TXOP duration. If the STA subsequently receives a second trigger frame, where the value in the persistent trigger subfield of the UL MU PPDU attributes field is set to the same value as in the persistent trigger subfield of the first trigger frame, the STA should use the stored attributes to determine how to transmit the UL MU PPDU that follows the second trigger frame.

In one embodiment, the attributes (e.g., UL MU PPDU attributes and STA PSDU attributes) indicated in a trigger frame are valid during a given TXOP duration (and a STA stores the attributes at least for the duration of the TXOP, as described above). In other embodiments, the attributes indicated in a trigger frame are valid during a beacon interval in which the trigger frame was transmitted (and a STA stores the attributes at least for the duration of the beacon interval).

In one embodiment, an AP may obtain a TXOP before transmitting a trigger frame. During the TXOP, the AP may transmit the trigger frame to a group of STAs, and the AP may expect to receive a UL MU PPDU from the group of STAs.

In one embodiment, a STA transmits a frame (e.g., data frame, management frame, or control frame) to an AP that the STA is associated with, where the frame indicates the queue size at the STA (e.g., either for the same access category as the data in the data frame or for all access categories). After receiving the frame from the STA, the AP may transmit a trigger frame and initiate a TXOP. In this embodiment, before transmitting a data frame to the AP, the STA may perform a backoff procedure according to the rules for the access category to which the data in the data frame belongs (e.g., the STA performs backoff with a value of AIFS[AC]+backoff_value, where backoff_value is a randomly chosen according to contention rules). In one embodiment, the data frame includes an indication of a queue size at the STA for the same access category as the data in the data frame or for all access categories. After the AP receives the data frame from the STA, it transmits any relevant ACK frames or Block ACK frames that is required by the data frame. Then, depending on the queue size indicated in the data frame received from the STA, the AP may decide to transmit a trigger frame to initiate a UL MU simultaneous transmission (e.g., either UL MU OFDMA transmission or UL MU MIMO transmission) in which the STA is assigned a transmission resource. In such a case, the AP may not need to perform any back-off before transmitting the trigger frame, but may transmit the trigger frame after SIFS or Point Coordination Function (PCF) IFS (PIFS) time with appropriate values to initiate a TXOP. The reason that the AP may refrain from performing back-off and start the TXOP after an IFS time after receiving the frame from the STA is because the STA has already performed the necessary backoff and since the AP is going to transmit a trigger frame that initiates a UL MU simultaneous transmission in which the STA is assigned a transmission resource, there is no loss of fairness. This is similar to the situation in which a STA and an AP have jointly performed a full back-off according to the contention rules. This concept is referred to as joint back-off and refers to the concept where as long as a STA has performed back-off according to the contention rule, the responding STA (which in this case is the AP that is going to transmit a trigger frame to initiate a UL MU simultaneous transmission) need not perform back-off again, as long as the trigger frame initiates a UL MU simultaneous transmission in which the STA is assigned a transmission resource and as long as data belonging to an access category that is lower priority than the access category of the data in the initial frame received from the STA is not allowed to be transmitted during the UL MU simultaneous transmission. In one embodiment, the access category constraint might be further limited so that the responding STA (e.g., the AP) is to only transmit a trigger frame that initiates a UL MU simultaneous transmission in which data belonging to an access category that is the same as the access category of the data in the initial frame received from the STA is allowed. In another embodiment, the access category constraint might be lifted so that the responding STA (e.g., the AP) may transmit a trigger frame that initiates a UL MU simultaneous transmission in which data belonging to all access categories is allowed. In one embodiment, a STA first transmits a data or management frame to the AP that includes an indication of a queue size at the STA and the AP transmits a trigger frame that includes an indication that all of the STAs that participate in a UL MU simultaneous transmission (including the STA that transmitted the data or management frame to the AP) are to first respond with a clear-to-send (CTS) frame and then after a SIFS time transmit a UL MU PPDU to the AP as part of the UL MU simultaneous transmission. In this case, the duration field of the MAC header of the CTS frame may be set to the same value as indicated in the duration subfield of the trigger frame that initiated the UL MU simultaneous transmission minus the duration of the CTS frame and minus two SIFS time. In one embodiment, the duration of the CTS frame is calculated based on a robust MCS level that is known to the AP and STAs beforehand and all of the STAs use the known MCS level to encode their CTS frame. In one embodiment, the frame that the STA first transmits to the AP could be a data frame that allows data belonging to any access category that the STA decides. In one embodiment, the frame that the STA first transmits to the AP is a PS-Poll frame, a QoS Null data frame that allows data belonging to any access category that the STA decides, or a UL Request frame. In one embodiment, in the case that the STA transmits a PS-Poll frame to the AP, the AP may transmit a trigger frame after SIFS or PIFS time that initiates a UL MU simultaneous transmission in which only data belonging to the lowest priority access category is allowed, otherwise the AP is to perform relevant backoff for the desired access category (e.g., the AP is to perform backoff with value AIFS[AC]+ backoff_value before transmitting the trigger frame).

In the process of forming a UL MU PPDU, a new TXVECTOR parameter may be used, which is denoted by Power_Boost. The Power_Boost parameter is a scalar value which is used in HE OFDMA PPDU. The Power_Boost parameter in TXVECOTR is used by the MAC layer to tell the PHY layer how much increased transmission power, with respect to the power transmission over a 20 MHz sub-band such transmission of legacy frame over the primary 20 MHz channel, is allowed for the UL MU PPDU (e.g., UL MU OFDMA PPDU or UL MU MIMO PPDU). In one embodiment, the Power_Boost parameter in TXVECOTR is mandatory for UL OFDMA PPDUs.

When an AP transmits a trigger frame that initiates a UL MU simultaneous transmission, the UL MU PPDU attributes field of the trigger frame may include a duration subfield. Each STA that participates in the UL MU simultaneous transmission may perform a padding procedure based on the bandwidth of a transmission resource assigned to itself. In a padding procedure, a STA pads its payload (either in MAC layer or PHY layer, or both) so that the length of its UL MU PPDU is the same as the length indicated in the duration subfield of the UL MU PPDU attributes field of the trigger frame that initiated the UL MU simultaneous transmission. For example, if the bandwidth of the transmission resource assigned to a STA is 2 MHz, then the STA may pad its payload accordingly. If the bandwidth of the transmission resource assigned to a STA is 4 MHz, then the STA may pad its payload accordingly. If the bandwidth of the transmission resource assigned to a STA is equal to or larger than 10 MHz, then the STA may pad its payload accordingly. If the bandwidth of the transmission resource assigned to a STA is equal to or larger than 20 MHz, then the STA may pad its payload accordingly.

In one embodiment, if the bandwidth of a transmission resource assigned to a STA is 2 MHz and the Power_Boost parameter of the TXVECTOR of the UL OFDMA PPDU that the STA is about to transmit in response to a trigger frame is larger than a threshold value, then the STA may pad its payload accordingly. In one embodiment, if the bandwidth of a transmission resource assigned to a STA is 4 MHz and the Power_Boost parameter of the TXVECTOR of the UL MU OFDMA PPDU that the STA is about to transmit in response to a trigger frame is larger than a threshold value, then the STA may pad its payload accordingly. In one embodiment, if the value in the relevant padding subfield (depending on embodiments, the padding subfield might apply to all of the STAs that are indicated in the trigger frame or might apply to all of the STAs that are indicated in the trigger frame for a given 20 MHz sub-band, or might apply to a specific STA) indicates that a STA is to apply padding, then the STA pads its payload accordingly. Otherwise if the value in the padding subfield indicates that padding is optional for the STA, then the STA may or may not pad its payload.

When an AP transmits a trigger frame that initiates a UL MU simultaneous transmission, where the trigger frame includes an indication of the set of STAs that are to participate in the UL MU simultaneous transmission, it is not guaranteed that all of the STAs in the set of STAs successfully receive the trigger frame correctly. As such, some of the STAs might participate in the UL MU simultaneous transmission and some of the STAs might not. Thus, it is possible that the AP may successfully receive a UL payload, an MPDU, or an A-MPDU from some of the STAs but not from all of the STAs during the UL MU simultaneous transmission.

In one embodiment, the exchange of trigger frame and subsequent UL MU PPDU is considered successful if at least one STA that is assigned a transmission resource in the primary 20 MHz channel responds to the trigger frame. In other words, the exchange of trigger frame and subsequent UL MU PPDU is considered successful if the AP successfully receives a UL MPDU/A-MPDU (e.g., aggregated MPDU) from at least one STA indicated in the trigger frame that is assigned a transmission resource within the primary 20 MHz channel. In one embodiment, the exchange of trigger frame and subsequent UL MU PPDU is considered successful if the AP successfully receives a UL MPDU/A-MPDU from all of the STAs indicated in the trigger frame that are assigned a transmission resource within the primary 20 MHz channel.

In one embodiment, the STAs that did not respond to a first trigger frame should not be indicated in a subsequent trigger frame that is transmitted within the same TXOP as the first trigger frame. In one embodiment, the STAs that did not respond to a first trigger frame and were assigned to a transmission resource in the primary channel of the BSS should not be indicated as being assigned to a transmission resource in the primary channel of the BSS in a subsequent trigger frame. In one embodiment, the STAs that did not respond to a first trigger frame should not be indicated in a subsequent trigger frame if the subsequent trigger frame is transmitted within the same TXOP as the first trigger frame and if the same or lower MCS level as in the first trigger frame is used. In one embodiment, if an AP transmits a first trigger frame and some of the STAs indicated in the first trigger frame do not respond, an AP may transmit a subsequent trigger frame to the same set of STAs as indicated in the first trigger frame or to a set of STAs that include part or all of the STAs that did not respond to the first trigger frame only if the AP includes an indication in the subsequent trigger frame that the STAs are to first respond with a CTS frame and then wait IFS time before transmitting a UL MU PPDU to the AP during the UL MU simultaneous transmission.

In one embodiment, the UL MU PPDU attributes field of a trigger frame may include a cascade indication subfield. The cascade indication subfield is used to indicate whether a subsequent trigger frame is scheduled to be transmitted following the current trigger frame. For example, if the value in the cascade indication subfield is set to "1" or a TRUE value, then this indicates that a subsequent trigger frame follows the current trigger frame. Otherwise, the value in the cascade indication subfield is set to "0" or FALSE value. A STA that receives a trigger frame may determine whether it should transition to a sleep or doze state (e.g., power saving mode) based on the value in the cascade indication subfield. However, the value in the cascade indication subfield does not help the STA determine the approximate time at which the next trigger frame will be transmitted. As such, the STA does not know when it should transition to an awake state in order to receive the next trigger frame.

In one embodiment, an AP (e.g., HE AP) may indicate, in a beacon frame, the start times of one or more trigger frames that the AP is scheduled to transmit in the future. For example, in one embodiment, the beacon frame may include target wake time (TWT) information that indicates the time at which one or more trigger frames will be transmitted within a service period (SP) or a beacon interval (BI), where the one or more trigger frames may initiate a UL MU simultaneous transmission that allows random access. However, it is not unusual for a STA to miss one or more beacon frames due to the STA being in a sleep or doze state (e.g., to save power) or due to collisions. If a STA misses a beacon frame, the STA will miss all the TWT information included in that beacon frame, and unless it stays in an awake state for a long period of time, it will miss any future trigger frames.

Figure 2:
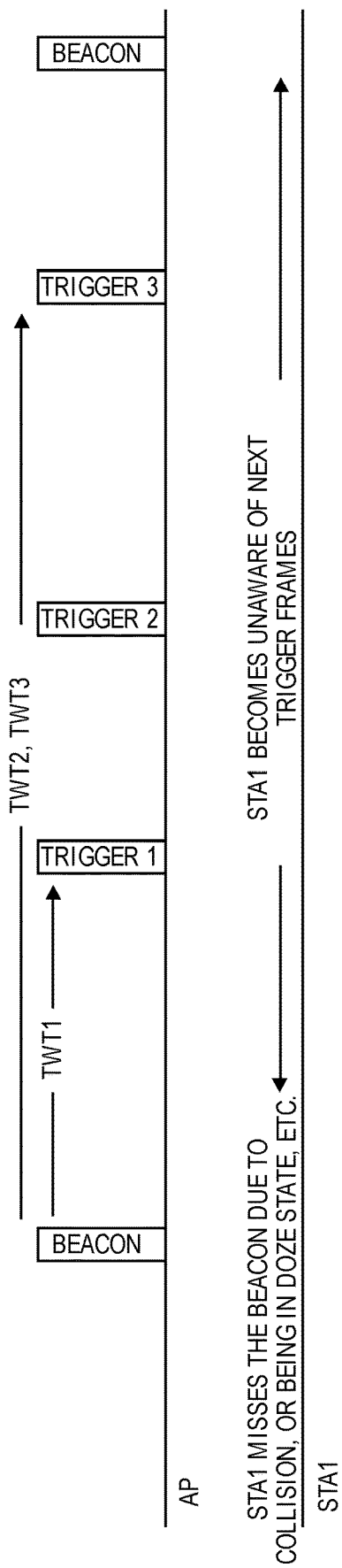
FIG. 2 is a diagram illustrating operations in a WLAN where a STA misses a beacon frame transmitted by an AP and thus is unaware of the start time of trigger frame transmissions, according to some embodiments.

FIG. 2 is a diagram illustrating operations in a WLAN where a STA misses a beacon frame transmitted by an AP and thus is unaware of the start time of trigger frame transmissions, according to some embodiments. As shown in the diagram, an AP transmits a beacon frame that includes information regarding the start times of scheduled trigger frame transmissions. For example, the beacon frame may include information regarding the start times of trigger frames Trigger 1, Trigger 2, and Trigger 3. In this example, STA1 misses the beacon frame due to a collision or due to being in a sleep state (e.g., doze state). As such, STA1 is unaware of the start times of trigger frames Trigger 1, Trigger 2, and Trigger 3.

Embodiments described herein alleviate this problem by including information regarding a future trigger frame (e.g., including the start time of the future trigger frame) in a trigger frame. This way, even if a STA misses the beacon frame, it can still become aware of the start time of future trigger frames. For this purposes, the UL MU PPDU attributes field of a trigger frame may include a cascade trigger info subfield (sometimes referred to as a next trigger info subfield), where the cascade trigger info subfield is used to indicate information regarding a future trigger frame that is scheduled to be transmitted by AP. For example, if the value in the cascade indication subfield of a trigger frame indicates that a subsequent trigger frame is scheduled to be transmitted, then the trigger frame also includes the cascade trigger info subfield, which includes information regarding the subsequent trigger frame. In one embodiment, the information regarding the subsequent trigger frame includes information regarding the time at which the subsequent trigger frame is scheduled to be transmitted (the start time of the subsequent trigger frame). This may be indicated as a relative time reference to the beginning or end of the current trigger frame (or a relative time reference to the end of the UL MU PPDU that follows the trigger frame) in units of any time unit (TU).

Figure 3:
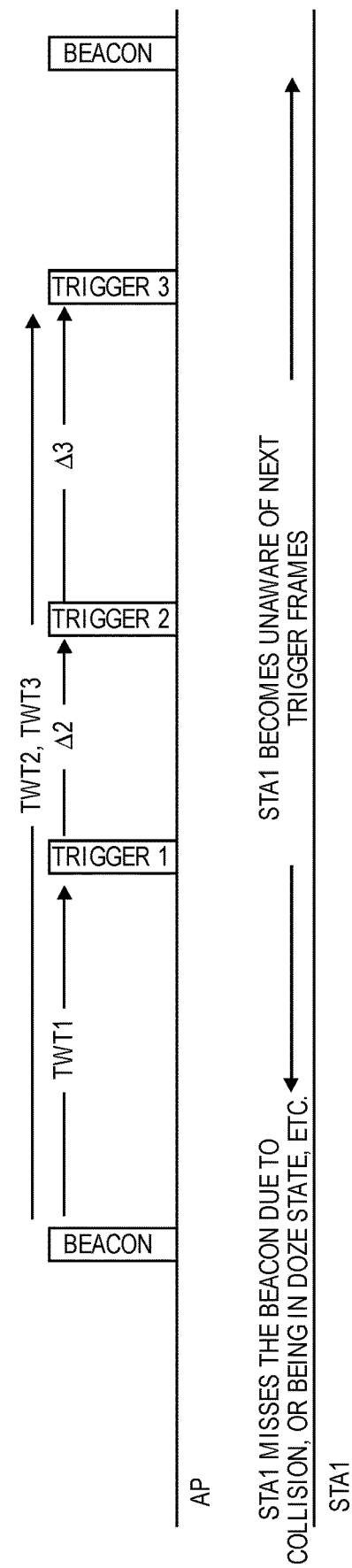
FIG. 3 is a diagram illustrating operations in a WLAN where even though a STA misses a beacon frame transmitted by an AP, the STA becomes aware of the start time of trigger frame transmissions based on information included in a trigger frame, according to some embodiments.

FIG. 3 is a diagram illustrating operations in a WLAN where even though a STA misses a beacon frame transmitted by an AP, the STA becomes aware of the start time of trigger frame transmissions based on information included in a trigger frame, according to some embodiments. As shown in the diagram, an AP transmits a beacon frame that includes information regarding the start times of scheduled trigger frame transmissions. For example, the beacon frame may include information regarding the start times of trigger frames Trigger 1, Trigger 2, and Trigger 3. In this example, STA1 misses the beacon frame due to a collision or due to being in a sleep state (e.g., doze state). Subsequently, the AP transmits a trigger frame Trigger 1, where this trigger frame includes information regarding the start time of trigger frame Trigger 2 (represented as $\Delta 2$). When STA1 receives trigger frame Trigger 1, it can determine the time at which the AP will transmit trigger frame Trigger 2 based on $\Delta 2$. Trigger frame Trigger 2 may also include information regarding the start time of trigger frame Trigger 3 (represented as $\Delta 3$). When STA1 receives trigger frame Trigger 2, it can determine the time at which the AP will transmit trigger frame Trigger 3 based on $\Delta 3$.

In one embodiment, the value in the cascade trigger info subfield is set to a reserved value (e.g., all-zero or all-one value) to indicate that there is no subsequent trigger frame scheduled to be transmitted in the current beacon interval or SP. In one embodiment, the value in the cascade trigger info subfield is set to another reserved value to indicate that there is a subsequent trigger frame scheduled to be transmitted in the current beacon interval or SP, but that the start time of the subsequent trigger frame is not available or not determined by the AP. Different embodiments may utilize different TU to indicate the timing information regarding a trigger frame. In one embodiment, TU is a fraction of target beacon transmission time (TBTT), such as one hundredth of a TBTT. In one embodiment, TU is a time value such as 10 microseconds or 100 microseconds. In one embodiment, the value in the cascade trigger info subfield indicates timing information for a subsequent trigger frame that is scheduled to be transmitted in the current beacon interval or the next beacon interval. In one embodiment, the value in the cascade trigger info subfield indicates whether a trigger frame is scheduled to be transmitted in the next beacon interval (where it is assumed that the trigger frame appears with a given time reference to a beacon frame). In one embodiment, a trigger frame includes multiple cascade trigger info subfields, where the value in the first cascade trigger info subfield indicates timing information regarding a first trigger frame that is scheduled to be transmitted and where the value in the second cascade trigger info subfield indicates timing information regarding a second trigger frame that is scheduled to be transmitted, and so on. In such embodiments, the total number of cascade trigger info subfields may be known to all of the associated STAs, or another field or subfield within the trigger frame may indicate the total number of cascade trigger info subfields.

In one embodiment, a cascade trigger info subfield is included in a trigger frame that initiates a UL MU simultaneous transmission that allows random access (e.g., where the trigger frame does not specifically indicate the group of STAs that are to participate in the UL MU simultaneous transmission, but instead a group of STAs are eligible to choose a transmission resource from the transmission resources indicated in the trigger frame that allow random access). A trigger frame that initiates a UL MU simultaneous transmission that allows random access is sometimes referred to herein as a random access trigger frame (RA_TR frame). In one embodiment, when a RA_TR frame includes a cascade trigger info subfield, the value in the cascade trigger info subfield indicates timing information regarding a next RA_TR frame that is scheduled to be transmitted (e.g., in the current beacon interval). In one embodiment, when a RA-TR frame includes a cascade trigger info subfield, a STA that receives such RA-TR frame and desires to transmit a payload in response to the RA-TR frame may attempt to do so based on the random access rules. It should be noted however, that executing the random access rules may result in the STA not being able to transmit its payload in response to the RA-TR frame (e.g., due to the instantaneous outcome of the execution of the random access back-off rules). In such a case, the STA may determine the time at which a subsequent RA-TR frame will be transmitted based on the value in the cascade trigger info subfield of the current trigger frame and then plan to transmit its payload in response to the subsequent RA-TR frame. In one embodiment, the STA may transition to a sleep or doze state until the time at which the subsequent RA-TR frame is expected to be transmitted and wake up around that time to receive the subsequent RA-TR frame. The STA may then execute the random access rules again to find out whether it is eligible to transmit its payload in response to the subsequent RA-TR frame. In one embodiment, a STA might have had the chance to transmit its payload in response to a first RA-TR frame, but may have not received an acknowledgement frame from the AP in response to the frame that the STA transmitted during the random access phase. The reason for this may be that the AP did not successfully receive the frame transmitted by the STA or because there was a collision. In the case that the STA does not receive an acknowledgement frame from the AP, the STA may determine the time at which a subsequent RA-TR frame will be transmitted based on the value in the cascade trigger info subfield of the current trigger frame and then plan to transmit its payload again in response to the subsequent RA-TR frame. In one embodiment, the STA may transition to a sleep or doze state until the time at which the subsequent RA-TR frame is expected to be transmitted and wake up around that time to receive the subsequent RA-TR frame. The STA may then execute the random access rules to find out whether it is eligible to transmit its payload in response to the subsequent RA-TR frame. In one embodiment, if a RA-TR frame includes multiple cascade trigger info subfields (each representing a trigger frame that initiates a UL MU simultaneous transmission that allows random access), a STA might choose to participate in one or more of the upcoming random access opportunities. If the STA decides to skip the first random access opportunity and instead participate in the second random access opportunity, then the STA may transition to a sleep or doze state for a duration that is determined based on the values in the first cascade trigger info subfield and/or the second cascade trigger info subfield (e.g., the sum of the durations indicated in the first cascade trigger info subfield and the second cascade trigger info subfield).

In one embodiment, the value in the cascade trigger info subfield may represent a timer, a time reference, or counter to the next trigger frame. For example the value in the cascade trigger info subfield may represent a timer with a predetermined time unit that indicates the timing of the next trigger frame (for a specific type of trigger frame—e.g., RA-TR frame). In one embodiment, the value in the cascade trigger info subfield may indicate additional information such as the trigger type and/or TWT Flow Identifier. In one embodiment, when the value in the cascade indication subfield is set to "1" or TRUE value (which indicates that a subsequent trigger frame is scheduled to be transmitted), the cascade trigger info subfield includes some of the TWT parameters such as Flow Identifier field value, or a full TWT element IE. The TWT Flow Identifier field may be present in TWT Information field and it is a 3-bit subfield that identifies the specific information for this TWT request uniquely from other requests made between the same TWT requesting STA and TWT responding STA pair.

An AP may indicate the start times of one or more trigger frames that initiate a UL MU simultaneous transmission that allows random access in a beacon frame. A STA that receives such a beacon frame may transition to a sleep or doze state until the time at which the AP is expected to transmit a trigger frame, as indicated in the beacon frame. In one embodiment, if a sequence of trigger frames all initiate a UL MU simultaneous transmission that allows random access, then all of the trigger frames in this sequence should have its cascade indication subfield set to a value of 1, except for the last trigger frame in the sequence, which should have its cascade indication subfield set to a value of "0" or FALSE value. In one embodiment, if a sequence of trigger frames all initiate a UL MU simultaneous transmission that allows random access, then all but the last trigger frame in this sequence should have its cascade indication subfield set to a value of "1" or TRUE value and should include a cascade trigger info subfield that is set with a value that indicates timing information regarding a future trigger frame transmission. In one embodiment, the last trigger frame in this sequence should have its cascade indication subfield set to a value of "0" or FALSE value. In one embodiment, the last trigger frame in the sequence has its cascade indication subfield set to a value of "1" or TRUE value if there is another trigger frame that is scheduled to be transmitted in the next beacon interval or the next SP. In this case, the value in the cascade trigger info subfield indicates timing information regarding a future transmission of one or more trigger frames. In this case, the trigger frame may also include an indication of whether the future trigger frame transmission will occur in the current beacon interval or SP or the next beacon interval or SP.

A STA may determine whether it should transition to a sleep or doze state based on the value in the cascade indication subfield and/or the value in the cascade trigger info subfield of a trigger frame. If the OFDMA back-off (OBO) counter decrements to a non-zero value with the random access procedure in a trigger frame, where the value in its cascade indication subfield set to "1" or TRUE value, it may transition to a sleep or doze state immediately, and may use the value in the cascade trigger info subfield to determine when the next trigger frame is scheduled to be transmitted. The STA may then transition to an awake state shortly before the next trigger frame is scheduled to be transmitted to receive the next trigger frame. If the OBO counter decrements to a non-zero value with the random access procedure in a trigger frame, where the value in the cascade indication subfield set to "0" or FALSE value, it may remain in an awake state to receive the next trigger frame.

A STA that transmits a frame carrying a TWT element to a STA may set the value of the trigger subfield of the Request Type field of a TWT element to 1, indicating a trigger-based TWT where the STA would have the chance to transmit its UL data, without contending the medium, in one or more UL MU PPDUs. Otherwise, the STA shall set the value of the trigger subfield to 0. In a TWT response, a trigger field set to 1 indicates a trigger enabled TWT. The TWT responding STA of a trigger-enabled TWT agreement should schedule for transmission of a trigger frame to the TWT requesting STA, within each TWT SP for that TWT agreement. The TWT responding STA that intends to transmit additional trigger frames during a trigger-enabled TWT SP should set the value of the cascade indication subfield of the trigger frame to 1 to indicate that it will transmit another trigger frame within the same TWT SP, and should include a cascade trigger info subfield that includes a timer/counter to the one or more upcoming trigger frames and possibly with an indication of the trigger type, TWT Flow indicator (or other TWT parameters) of the one or more upcoming trigger frames. Otherwise, the value of the cascade indication subfield is set to 0.

The embodiments described herein are also applicable to trigger-enabled TWT service period (SP). In a trigger-enabled TWT SP, a TWT scheduling STA (e.g., an AP) schedules a TWT SP that includes one or more trigger frames (where random access is allowed) and in response to the trigger frames within the SP one or more of the TWT scheduled STAs access the trigger frames to transmit their payloads (e.g., to transmit a PS-Poll frame, QoS Null frames, data frames, etc.). In such cases, the TWT scheduling STA sets the trigger subfield in the Request Type field of a TWT element to "1" or TRUE value. The TWT scheduling STA that intends to transmit additional trigger frames during a Trigger-enabled TWT SP should set the cascade indication subfield of the trigger frame to a value of 1 to indicate that it will transmit another trigger frame within the same TWT SP, and should include additional information in the cascade trigger info subfield such as a timer/counter to the one or more of the upcoming trigger frames and possibly with trigger type indication or Flow indication (or other TWT parameters) of the one or more of the upcoming trigger frames. Otherwise, it shall set the value of the cascade indication subfield to 0.

The embodiments described herein are also applicable to the cases where a TWT scheduling STA (e.g., an AP) schedules multiple trigger-enabled TWT SPs within one beacon interval, where each trigger-enabled TWT SP includes one or more trigger frames (which possibly includes at least one transmission resource that allows random access), where one or more TWT scheduled STAs access the one or more trigger frames within the one or more of the trigger-enabled TWT SPs to transmit their payloads (e.g., either PS-Poll frame, QoS Null frames, data frames, etc.). In such a case, the TWT scheduling STA indicates the beginning of an upcoming trigger-enabled TWT SP (or the first trigger frame within an upcoming trigger-enabled TWT SP) in the last trigger frame of the previous trigger-enabled TWT SP. This may be indicated by setting the value of the cascade indication subfield to "1" or TRUE value and setting the value of the cascade trigger info to a value that indicates a timer/counter to the (one or more of the) upcoming trigger frames (and possibly with trigger type indication, Flow indicator, or other TWT parameters) and possibly with another indicator that indicates that the next trigger frame is in an upcoming trigger-enabled TWT SP. In on embodiment, the cascade trigger info subfield refers to the beginning of the upcoming trigger-enabled TWT SPs (and possibly with an indication that the cascade trigger info subfield refers to an upcoming trigger-enabled TWT SPs.

In one embodiment, when a trigger frame is transmitted in SU manner (e.g., in a SU PPDU) and the value in the cascade indication subfield of the trigger frame is set to "1" or TRUE value, the value in the cascade trigger info subfield of the trigger frame indicates information regarding a trigger frame of the same type or the same Flow Indicator.

In one embodiment, when a trigger frame is transmitted in MU manner (e.g., in an MU PPDU) and the value in the cascade indication subfield in the trigger frame is set to a "1" or TRUE value, the value in the cascade trigger info subfield in the trigger frame indicates information regarding a trigger frame of the same type or the same Flow Indicator.

In one embodiment, all trigger frames transmitted in MU manner (e.g., in an MU PPDU) include information that points to the same type of trigger frame or the same Flow Indicator. In such case, the value in the cascade indication subfield in all of the trigger frames are set to the same value (e.g., either all set to TRUE value or all set to FALSE value).

Figures 4A, 4B, 4C:
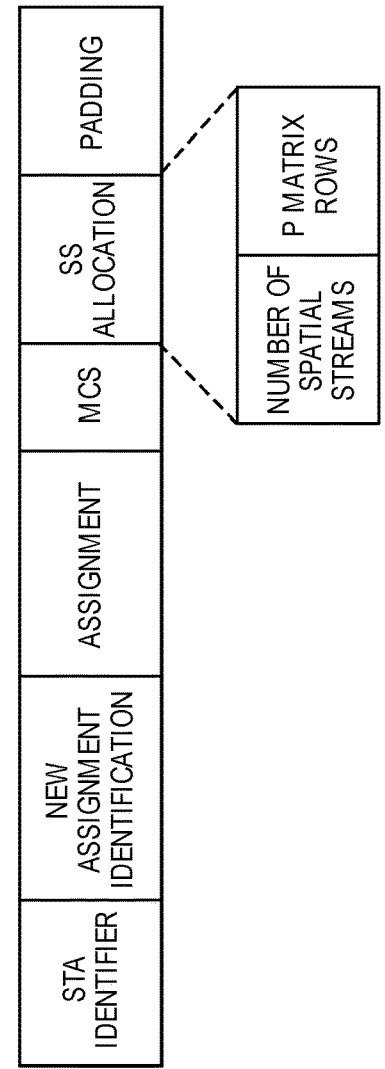
FIG. 4A is a diagram illustrating a format of a trigger frame, according to some embodiments.
FIG. 4B is a diagram illustrating a format of a common info field or UL MU PPDU attributes field, according to some embodiments.
FIG. 4C is a diagram illustrating a format of a per-user info field or STA PSDU attributes field, according to some embodiments.

FIG. 4A is a diagram illustrating a format of a trigger frame, according to some embodiments. As shown, the trigger frame includes a frame control field, a duration field, a receiver address (RA) field, a transmitter address (TA) field, a common info field (or UL MU PPDU attributes field), multiple per-user info fields (or STA PSDU attributes fields), a padding field, and a frame check sequence (FCS) field. The common info field is used to indicate various UL MU PPDU attributes. Each per-user info field is used to indicate various STA PSDU attributes for a particular STA. The format of the trigger frame shown in the diagram is provided by way of example and not limitation. The common info field can include more or less subfields than shown, and may include different types of subfields.

FIG. 4B is a diagram illustrating a format of a common info field or UL MU PPDU attributes field, according to some embodiments. As illustrated in this example, the common info field includes a cascade indication subfield, persistent trigger subfield, a bandwidth subfield, a MU PPDU type subfield, a guard interval (GI) subfield, a duration subfield, a group identifier subfield, an access category (AC) subfield, an access category restriction subfield, a padding subfield, a P matrix size subfield, and a cascade trigger info subfield. It should be understood that the format of the common info field shown in the diagram is provided by way of example and not limitation. It should be understood that the common info field can include more or less subfields than shown, and include different types of subfields. For example, the common info field can include any of the subfields described above for a UL MU PPDU attributes field.

FIG. 4C is a diagram illustrating a format of a per-user info field or STA PSDU attributes field, according to some embodiments. As illustrated in this example, the per-user info field includes a STA identifier subfield, a new assignment identification subfield, an assignment subfield, a modulation coding scheme (MCS) subfield, a spatial streams allocation subfield (which may include a number of spatial streams subfield and a P matrix row subfield), and a padding subfield. It should be understood that the format of the per-user info field shown in the diagram is provided by way of example and not limitation. It should be understood that the per-user info field can include more or less subfields than shown, and include different types of subfields. For example, the per-user info field can include any of the subfields described above for a STA PSDU attributes field.

Figure 5:
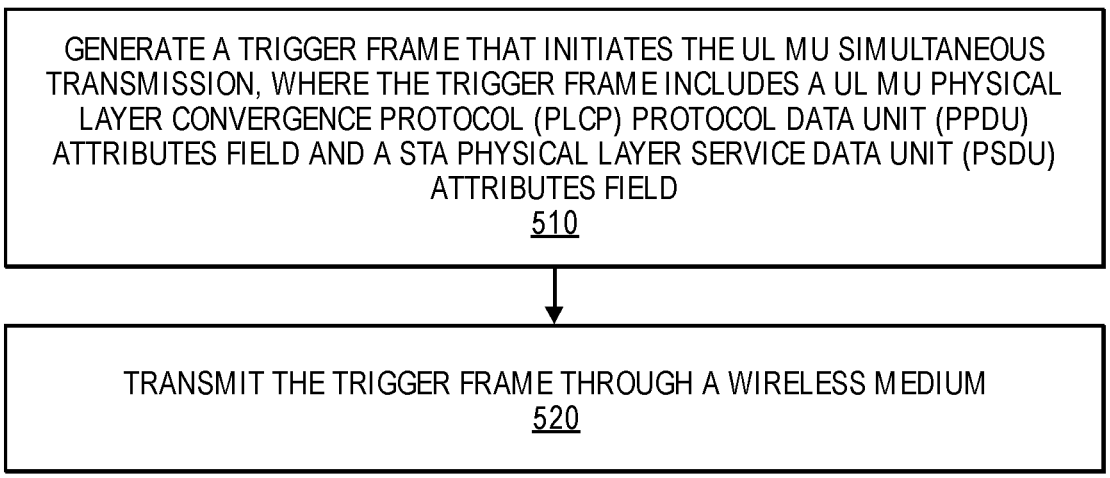
FIG. 5 is a flow diagram of a process implemented by a network device functioning as an AP to initiate a UL MU simultaneous transmission, according to some embodiments.

FIG. 5 is a flow diagram of a process implemented by a network device functioning as an AP to initiate a UL MU simultaneous transmission, according to some embodiments. In one embodiment, the operations of the flow diagram may be performed by a network device functioning as an AP in a wireless communications network (e.g., a WLAN). The operations in this flow diagram and other flow diagrams will be described with reference to the exemplary embodiments of the other figures. However, it should be understood that the operations of the flow diagrams can be performed by embodiments other than those discussed with reference to the other figures, and the embodiments discussed with reference to these other figures can perform operations different than those discussed with reference to the flow diagrams.

In one embodiment, the process is initiated when the AP generates a trigger frame that initiates the UL MU simultaneous transmission, where the trigger frame includes a UL MU PPDU attributes field to indicate attributes pertaining to a UL MU PPDU transmitted to the AP during the UL MU simultaneous transmission that are common to a plurality of STAs that are scheduled to participate in the UL MU simultaneous transmission and a STA PSDU attributes field for a particular STA from the plurality of STAs to indicate attributes pertaining to the UL MU PPDU that are specific to the particular STA (block 510). In one embodiment, the UL MU PPDU attributes field includes one or more of the subfields described above for a UL MU PPDU attributes field. In one embodiment, the STA PSDU attributes field includes one or more of the subfields described above for a STA PSDU attributes field. Once the AP generates the trigger frame, the AP transmits the trigger frame through a wireless medium (block 520).

Figure 6:
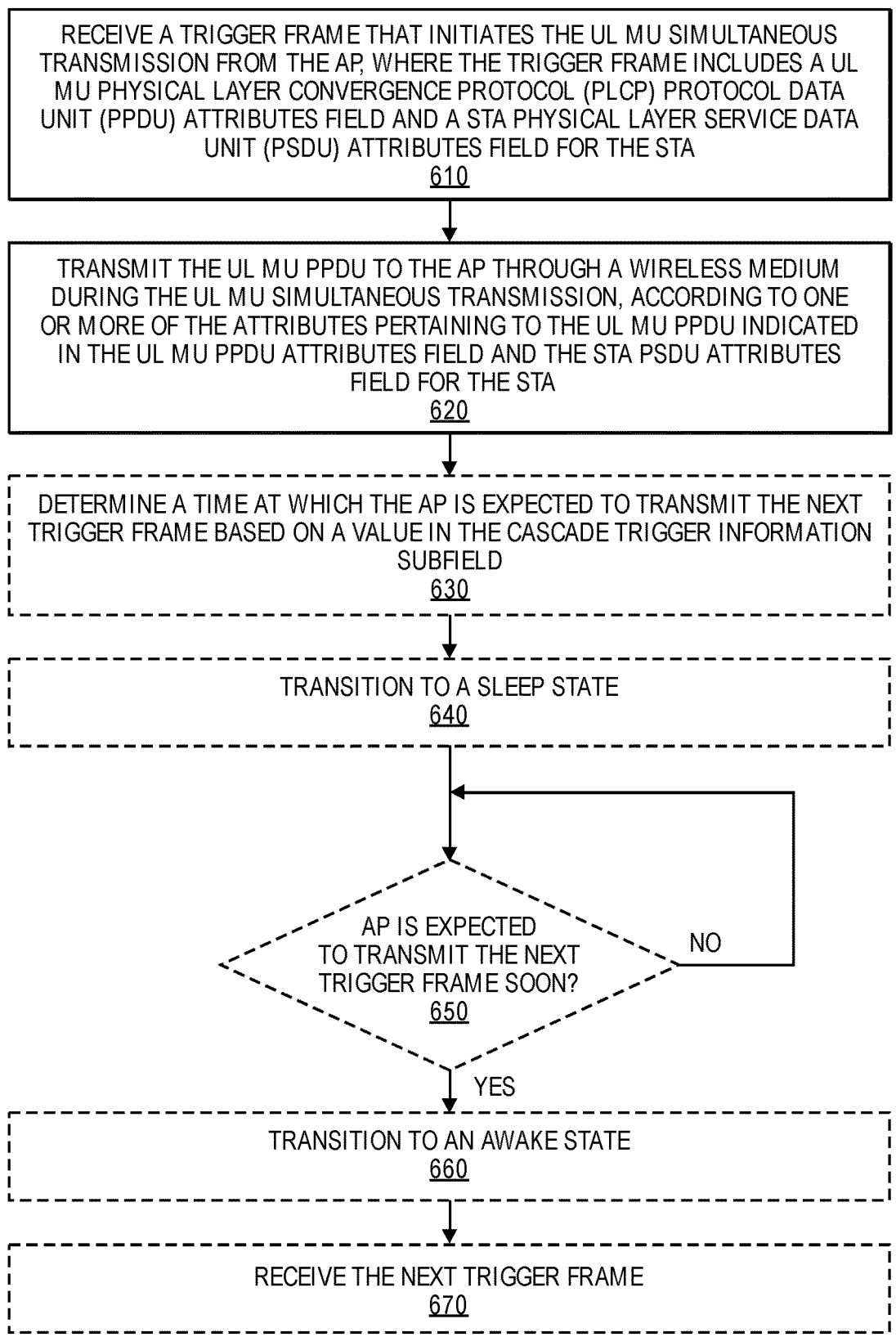
FIG. 6 is a flow diagram of a process implemented by a network device functioning as a STA to participate in a UL MU simultaneous transmission to an AP with one or more other STAs, according to some embodiments.

FIG. 6 is a flow diagram of a process implemented by a network device functioning as a STA to participate in a UL MU simultaneous transmission to an AP with one or more other STAs, according to some embodiments. In one embodiment, the operations of the flow diagram may be performed by a network device functioning as a non-AP STA in a wireless communications network (e.g., a WLAN).

In one embodiment, the process is initiated when the STA receives a trigger frame that initiates a UL MU simultaneous transmission from the AP, where the trigger frame includes a UL MU PPDU attributes field to indicate attributes pertaining to a UL MU PPDU transmitted to the AP during the UL MU simultaneous transmission that are common to the STA and one or more other STAs that are scheduled to participate in the UL MU simultaneous transmission and a STA PSDU attributes field for the STA to indicate attributes pertaining to the UL MU PPDU that are specific to the STA (block 610). In one embodiment, the UL MU PPDU attributes field includes one or more of the subfields described above for a UL MU PPDU attributes field. In one embodiment, the STA PSDU attributes field includes one or more of the subfields described above for a STA PSDU attributes field. In response to receiving the trigger frame, the STA transmits the UL MU PPDU (e.g., the STA's contribution to the UL MU PPDU) to the AP through a wireless medium during the UL MU simultaneous transmission, according to one or more of the attributes pertaining to the UL MU PPDU indicated in the UL MU PPDU attributes field and the STA PSDU attributes field for the STA (block 620). For example, in one embodiment, the UL MU PPDU attributes field includes a guard interval subfield to indicate a guard interval that the STA and the one or more other STAs are to apply to one or more portions of the UL MU PPDU. In this case, the STA may determine the guard interval that the STA is to apply to one or more portions of the UL MU PPDU based on an indication in the guard interval subfield and apply the determined guard interval to one or more portions of the UL MU PPDU. In one embodiment, the STA PSDU attributes field for the STA includes an assignment subfield to indicate a transmission resource unit that the STA is to use to transmit a set of MPDUs within the UL MU PPDU to the AP during the UL MU simultaneous transmission. In this case, the STA may determine the transmission resource unit that the STA is to use to transmit the set of MPDUs within the UL MU PPDU to the AP during the UL MU simultaneous transmission and use the determined transmission resource unit to transmit the UL MU PPDU to the AP during the UL MU simultaneous transmission. In one embodiment, the UL MU PPDU attributes field includes a persistent trigger subfield to indicate whether one or more of the attributes pertaining to the (upcoming) UL MU PPDU is the same as indicated in a previously transmitted trigger frame. In this case, the STA may determine that one or more attributes pertaining to the (upcoming) UL MU PPDU is the same as indicated in the previously transmitted trigger frame based on an indication in the persistent trigger subfield and apply one or more attributes indicated in the previously transmitted trigger frame to the (upcoming) UL MU PPDU. In one embodiment, the UL MU PPDU attributes field includes a bandwidth subfield to indicate a bandwidth of the UL MU PPDU. In this case, the STA may determine the bandwidth of the UL MU PPDU based on an indication in the bandwidth subfield and the transmission of the UL MU PPDU to the AP is based on the determined bandwidth of the UL MU PPDU. In one embodiment, the UL MU PPDU attributes field includes a duration subfield to indicate a length of the UL MU PPDU. In this case, the STA may determine the length of the UL MU PPDU based on an indication in the duration subfield and generate the UL MU PPDU such that the UL MU PPDU has the determined length of the UL MU PPDU. In one embodiment, the UL MU PPDU attributes field includes an access category subfield to indicate an access category for data included in the UL MU PPDU. In this case, the STA may determine the access category for data included in the UL MU PPDU based on an indication in the access category subfield and provide data in the UL MU PPDU that belongs to the access category. In one embodiment, the STA PSDU attributes field for the STA includes an MCS subfield to indicate an MCS level that the STA is to use for one or more portions of the UL MU PPDU. In this case, the STA may determine the MCS level that the STA is to use for one or more portions of the UL MU PPDU based on an indication in the MCS subfield and apply the determined MCS level to one or more portions of the UL MU PPDU. In one embodiment, the STA PSDU attributes field for the STA includes a STA identifier subfield to indicate an association identifier that identifies the STA. In this case, the STA may determine the association identifier based on an indication in the STA identifier subfield and determine that the STA PSDU attributes field for the STA indicates attributes pertaining to the UL MU PPDU that are specific to the STA based on a determination that the determined association identifier is an association identifier associated with the STA. In one embodiment, the STA PSDU attributes for the STA includes a spatial stream allocation subfield that includes a number of spatial streams subfield to indicate a number of spatial streams that the STA is to use to transmit the UL MU PPDU to the AP during the UL MU simultaneous transmission. In this case, the STA may determine the number of spatial streams that the STA is to sue to transmit the UL MU PPDU to the AP during the UL MU simultaneous transmission based on an indication in the number of spatial streams subfield and use the determined number of spatial streams when transmitting the UL MU PPDU to the AP. In one embodiment, the spatial streams allocation subfield also includes a P matrix rows subfield to indicate a set of rows of a P matrix that the STA is to use to generate a set of HE LTE symbols in the UL MU PPDU. In this case, the STA may determine the set of rows of the P matrix that the STA is to use to generate a set of HE LTE symbols in the UL MU PPDU based on an indication in the P matrix rows subfield and generate a set of HE LTE symbols in the UL MU PPDU based on the determined set of rows of the P matrix.

In one embodiment, the UL MU PPDU attributes field of the trigger frame includes a cascade trigger info subfield, where the value in the cascade trigger info subfield indicates the time at which the AP is expected to transmit the next trigger frame. The STA may determine the time at which the AP is expected to transmit the next trigger frame based on the value in the cascade trigger info subfield (block 630). The STA then transitions to a sleep or doze state (block 640) and determines whether the AP is expected to transmit the next trigger frame soon (e.g., based on the value in the cascade trigger info subfield) (decision block 650). If not, then the STA continues to wait until the time at which the AP is expected to transmit the next trigger frame. However, if the STA determines that the AP is expected to transmit the next trigger frame soon, then the STA transitions to an awake state (block 660) and receives the next trigger frame (block 670).

Figure 7:
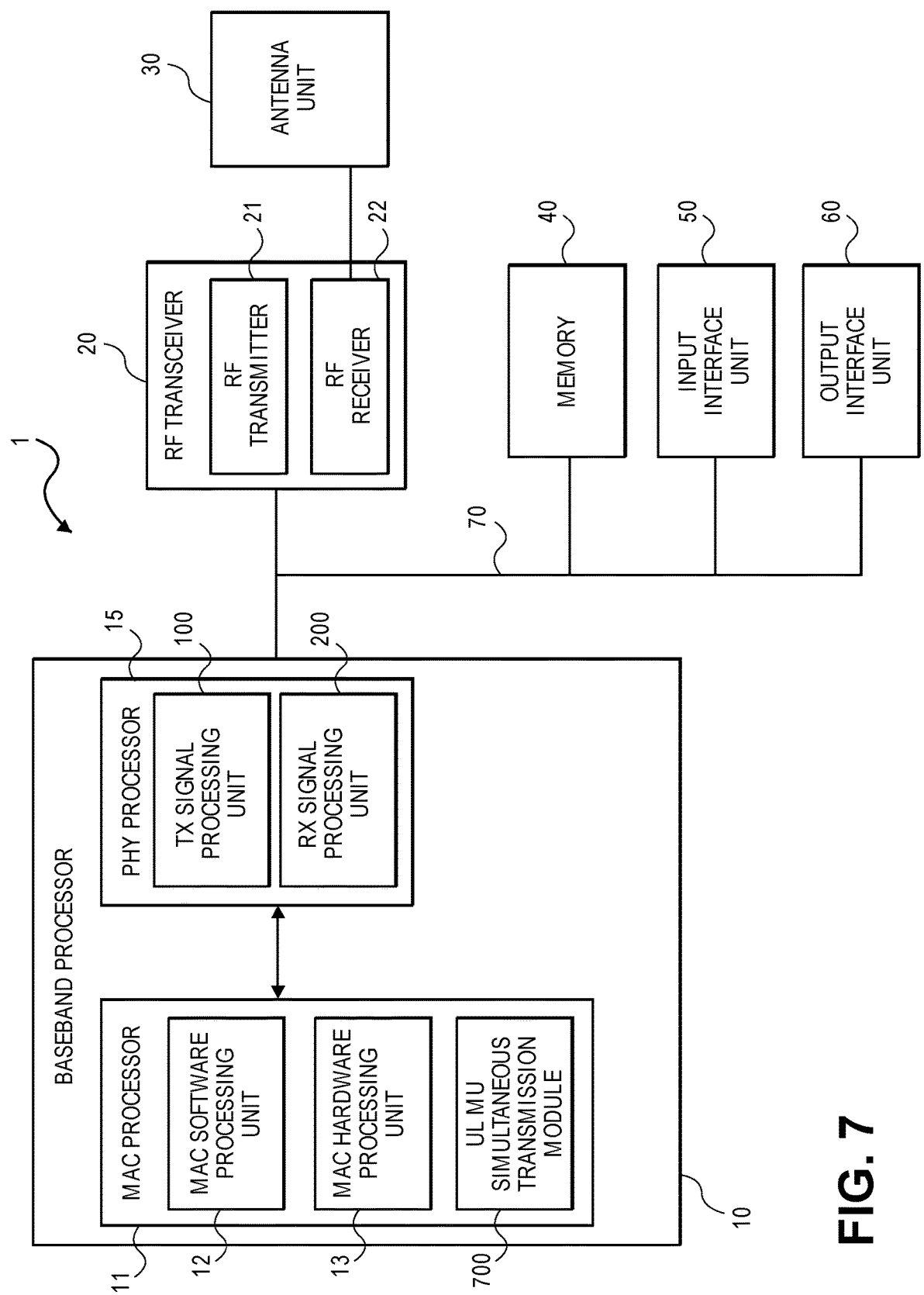
FIG. 7 is a block diagram of a network device implementing a STA or AP that executes a random access process and module, according to some embodiments.
Figure 8:
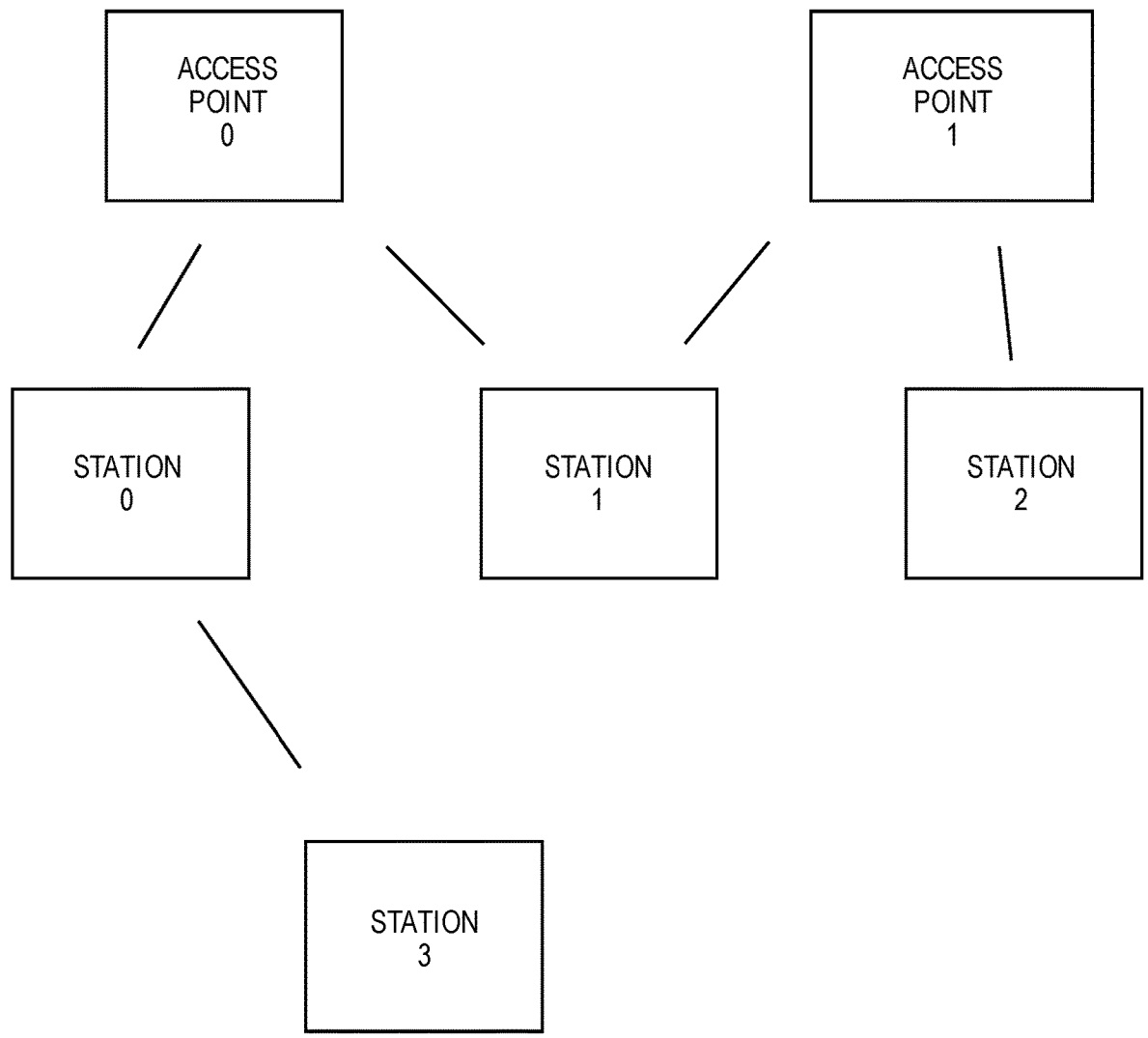
FIG. 8 is a block diagram of a WLAN, according to some embodiments.

FIG. 7 is a block diagram of a network device implementing a STA or AP that executes a random access process and module, according to some embodiments. In a wireless local area network (WLAN) such as the example WLAN illustrated in FIG. 8, a basic service set (BSS) includes a plurality of network devices referred to herein as WLAN devices. Each of the WLAN devices may include a medium access control (MAC) layer and a physical (PHY) layer according to IEEE 802.11 standard. In the plurality of WLAN devices, at least one WLAN device may be an AP station (e.g., access point 0 and access point 1 in FIG. 8) and the other WLAN devices may be non-AP stations (non-AP STAs), (e.g., stations 0-3 in FIG. 8). Alternatively, all of the plurality of WLAN devices may be non-AP STAs in an Ad-hoc networking environment. In general, the AP STA and the non-AP STA may be each referred to herein as a station (STA). However, for ease of description, only the non-AP STA will be referred to herein as a STA whereas the AP stations are referred to herein as APs for ease of description. As shown in FIG. 8, a WLAN can have any combination of STAs and APs that can form a discrete network, an ad hoc network or any combination thereof. Any number of APs and STAs can be included in a WLAN and any topology and configuration of such APs and STAs in the network can be utilized.

The example WLAN device 1 includes a baseband processor 10, a radio frequency (RF) transceiver 20, an antenna unit 30, memory 40, an input interface unit 50, an output interface unit 60, and a bus 70. The baseband processor 10 performs baseband signal processing, and includes a MAC processor 11 and a PHY processor 15. These processors can be any type of integrated circuit (IC) including a general processing unit or an application specific integrated circuit (ASIC). In some embodiments, the MAC processor 11 also implements a UL MU simultaneous transmission module 700. The UL MU simultaneous transmission module 700 can implement the respective functions for any combination of the embodiments described herein above with regard to FIGS. 1-5. In other embodiments, the UL MU simultaneous transmission module 700 may be implemented by or distributed over both the PHY processor 15 and the MAC processor 11. The UL MU simultaneous transmission module 700 may be implemented as software or as hardware components of either the PHY processor 15 or MAC processor 11.

In one embodiment, the MAC processor 11 may include a MAC software processing unit 12 and a MAC hardware processing unit 13. The memory 40 may store software (hereinafter referred to as "MAC software"), including at least some functions of the MAC layer. The MAC software processing unit 12 executes the MAC software to implement some functions of the MAC layer and the MAC hardware processing unit 13 may implement the remaining functions of the MAC layer in hardware (hereinafter referred to "MAC hardware"). However, the MAC processor 11 is not limited to this distribution of functionality.

The PHY processor 15 includes a transmitting signal processing unit 100 and a receiving signal processing unit 200 described further herein below with reference to FIGS. 9 and 10.

The baseband processor 10, the memory 40, the input interface unit 50, and the output interface unit 60 may communicate with each other via the bus 70. The radio frequency (RF) transceiver 20 includes an RF transmitter 21 and an RF receiver 22. The memory 40 may further store an operating system and applications. In some embodiments, the memory may store recorded information about captured frames. The input interface unit 50 receives information from a user and the output interface unit 60 outputs information to the user.

The antenna unit 30 includes one or more antennas. When a MIMO or MU-MIMO system is used, the antenna unit 30 may include a plurality of antennas.

Figure 9:
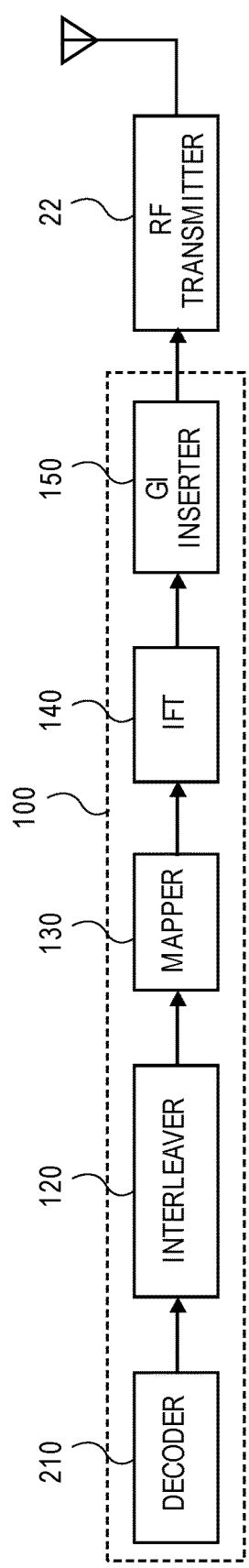
FIG. 9 is a schematic block diagram exemplifying a transmitting signal processor in a WLAN device, according to some embodiments.

FIG. 9 is a schematic block diagram exemplifying a transmitting signal processor in a WLAN device, according to some embodiments. Referring to the above drawing, a transmitting signal processing unit 100 includes an encoder 110, an interleaver 120, a mapper 130, an inverse Fourier transformer (IFT) 140, and a guard interval (GI) inserter 150. The encoder 110 encodes input data. For example, the encoder 110 may be a forward error correction (FEC) encoder. The FEC encoder may include a binary convolutional code (BCC) encoder followed by a puncturing device or may include a low-density parity-check (LDPC) encoder.

The transmitting signal processing unit 100 may further include a scrambler for scrambling the input data before encoding to reduce the probability of long sequences of 0s or 1s. If BCC encoding is used in the encoder 110, the transmitting signal processing unit 100 may further include an encoder parser for demultiplexing the scrambled bits among a plurality of BCC encoders. If LDPC encoding is used in the encoder 110, the transmitting signal processing unit 100 may not use the encoder parser.

The interleaver 120 interleaves the bits of each stream output from the encoder to change the order of bits. Interleaving may be applied only when BCC encoding is used. The mapper 130 maps the sequence of bits output from the interleaver to constellation points. If LDPC encoding is used in the encoder 110, the mapper 130 may further perform LDPC tone mapping in addition to constellation mapping.

When multiple input—multiple output (MIMO) or multiple user (MU)-MIMO is used, the transmitting signal processing unit 100 may use a plurality of interleavers 120 and a plurality of mappers 130 corresponding to the number Nss of spatial streams. In this case, the transmitting signal processing unit 100 may further include a stream parser for dividing outputs of the BCC encoders or the LDPC encoder into blocks that are sent to different interleavers 120 or mappers 130. The transmitting signal processing unit 100 may further include a space-time block code (STBC) encoder for spreading the constellation points from the Nss spatial streams into $N_{STS}$ space-time streams and a spatial mapper for mapping the space-time streams to transmit chains. The spatial mapper may use direct mapping, spatial expansion, or beamforming.

The IFT 140 converts a block of the constellation points output from the mapper 130 or the spatial mapper to a time domain block (i.e., a symbol) by using an inverse discrete Fourier transform (IDFT) or an inverse fast Fourier transform (IFFT). If the STBC encoder and the spatial mapper are used, the inverse Fourier transformer 140 may be provided for each transmit chain.

When MIMO or MU-MIMO is used, the transmitting signal processing unit 100 may insert cyclic shift diversities (CSDs) to prevent unintentional beamforming. The CSD insertion may occur before or after the inverse Fourier transform 140. The CSD may be specified per transmit chain or may be specified per space-time stream. Alternatively, the CSD may be applied as a part of the spatial mapper. When MU-MIMO is used, some blocks before the spatial mapper may be provided for each user.

The GI inserter 150 prepends a GI to the symbol. The transmitting signal processing unit 100 may optionally perform windowing to smooth edges of each symbol after inserting the GI. The RF transmitter 21 converts the symbols into an RF signal and transmits the RF signal via the antenna unit 30. When MIMO or MU-MIMO is used, the GI inserter 150 and the RF transmitter 21 may be provided for each transmit chain.

Figure 10:
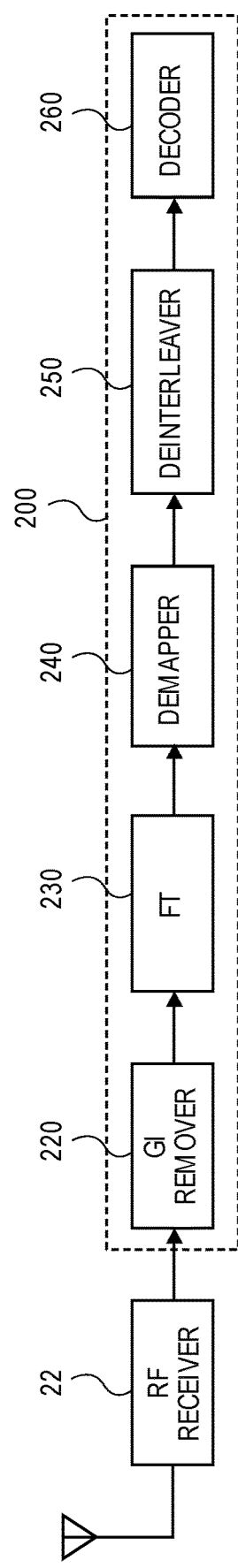
FIG. 10 is a schematic block diagram exemplifying a receiving signal processing unit in the WLAN, according to some embodiments.

FIG. 10 is a schematic block diagram exemplifying a receiving signal processing unit in the WLAN, according to some embodiments. Referring to FIG. 10, a receiving signal processing unit 200 includes a GI remover 220, a Fourier transformer (FT) 230, a demapper 240, a deinterleaver 250, and a decoder 260.

An RF receiver 22 receives an RF signal via the antenna unit 30 and converts the RF signal into symbols. The GI remover 220 removes the GI from the symbol. When MIMO or MU-MIMO is used, the RF receiver 22 and the GI remover 220 may be provided for each receive chain.

The FT 230 converts the symbol (i.e., the time domain block) into a block of constellation points by using a discrete Fourier transform (DFT) or a fast Fourier transform (FFT). The Fourier transformer 230 may be provided for each receive chain.

When MIMO or MU-MIMO is used, the receiving signal processing unit 200 may use a spatial demapper for converting the Fourier transformed receiver chains to constellation points of the space-time streams and an STBC decoder for despreading the constellation points from the space-time streams into the spatial streams.

The demapper 240 demaps the constellation points output from the Fourier transformer 230 or the STBC decoder to bit streams. If LDPC encoding is used, the demapper 240 may further perform LDPC tone demapping before constellation demapping. The deinterleaver 250 deinterleaves the bits of each stream output from the demapper 240. Deinterleaving may be applied only when BCC encoding is used.

When MIMO or MU-MIMO is used, the receiving signal processing unit 200 may use a plurality of demappers 240 and a plurality of deinterleavers 250 corresponding to the number of spatial streams. In this case, the receiving signal processing unit 200 may further include a stream deparser for combining the streams output from the deinterleavers 250.

The decoder 260 decodes the streams output from the deinterleaver 250 or the stream deparser. For example, the decoder 260 may be an FEC decoder. The FEC decoder may include a BCC decoder or an LDPC decoder. The receiving signal processing unit 200 may further include a descrambler for descrambling the decoded data. If BCC decoding is used in the decoder 260, the receiving signal processing unit 200 may further include an encoder deparser for multiplexing the data decoded by a plurality of BCC decoders. If LDPC decoding is used in the decoder 260, the receiving signal processing unit 200 may not use the encoder deparser.

Figure 11:
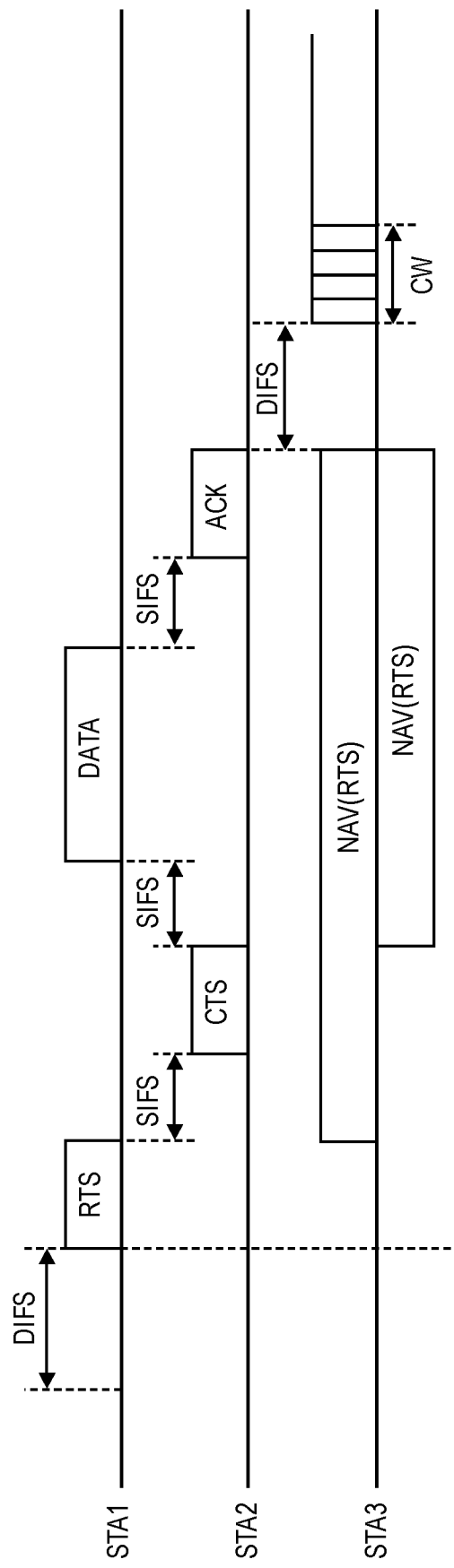
FIG. 11 is a timing diagram providing an example of the Carrier Sense Multiple Access/Collision Avoidance (CSMA/CA) transmission procedure, according to some embodiments.

FIG. 11 is a timing diagram providing an example of the Carrier Sense Multiple Access/Collision Avoidance (CSMA/CA) transmission procedure, according to some embodiments. In the illustrated example, STA1 is a transmit WLAN device for transmitting data, STA2 is a receive WLAN device for receiving the data, and STA3 is a WLAN device, which may be located at an area where a frame transmitted from the STA1 and/or a frame transmitted from the STA2 can be received by the WLAN device.

STA1 may determine whether the channel is busy by carrier sensing. The STA1 may determine the channel occupation based on a quality of the signal on the channel or correlation of signals in the channel, or may determine the channel occupation by using a network allocation vector (NAV) timer.

When determining that the channel is not used by other devices during DIFS (that is, the channel is idle), STA1 may transmit an RTS frame to STA2 after performing backoff. Upon receiving the RTS frame, STA2 may transmit a CTS frame as a response of the CTS frame after SIFS. When STA3 receives the RTS frame, it may set the NAV timer for a transmission duration of subsequently transmitted frames (for example, a duration of SIFS+CTS frame duration+

SIFS+data frame duration+SIFS+ACK frame duration) by using duration information included in the RTS frame. When STA3 receives the CTS frame, it may set the NAV timer for a transmission duration of subsequently transmitted frames (for example, a duration of SIFS+data frame duration+ SIFS+ACK frame duration) by using duration information included in the RTS frame. Upon receiving a new frame before the NAV timer expires, STA3 may update the NAV timer by using duration information included in the new frame. STA3 does not attempt to access the channel until the NAV timer expires.

When STA1 receives the CTS frame from the STA2, it may transmit a data frame to the STA2 after SIFS elapses from a time when the CTS frame has been completely received. Upon successfully receiving the data frame, the STA2 may transmit an ACK frame as a response of the data frame after SIFS elapses.

When the NAV timer expires, STA3 may determine whether the channel is busy through the use of carrier sensing techniques. Upon determining that the channel is not used by other devices during DIFS and after the NAV timer has expired, STA3 may attempt channel access after a contention window according to random backoff elapses.

The solutions provided herein have been described with reference to a wireless LAN system; however, it should be understood that these solutions are also applicable to other network environments, such as cellular telecommunication networks, wired networks, and similar communication networks.

An embodiment may be an article of manufacture in which a non-transitory machine-readable medium (such as microelectronic memory) has stored thereon instructions which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

Some portions of the preceding detailed descriptions have been presented in terms of algorithms and symbolic representations of operations on data bits within a computer memory. These algorithmic descriptions and representations are the ways used by those skilled in conferencing technology to most effectively convey the substance of their work to others skilled in the art. An algorithm is here, and generally, conceived to be a self-consistent sequence of operations leading to a desired result. The operations are those requiring physical manipulations of physical quantities. It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a conference device, or similar electronic computing device, that manipulates and transforms data represented as physical (electronic) quantities within the conference device's registers and memories into other data similarly represented as physical quantities within the conference device's memories or registers or other such information storage, transmission or display devices.

While the flow diagrams in the figures herein show a particular order of operations performed by certain embodiments, it should be understood that such order is exemplary (e.g., alternative embodiments may perform the operations in a different order, combine certain operations, overlap certain operations, etc.).

Those skilled in the art will recognize that the present disclosure is not limited to the embodiments described, and that the techniques described herein can be practiced with modification and alteration within the spirit and scope of the appended claims. The description is thus to be regarded as illustrative instead of limiting.

What is claimed is:

1. A method implemented by an Access Point (AP) in a Wireless Local Area Network (WLAN) to initiate an uplink (UL) multi-user (MU) simultaneous transmission, the method comprising:

generating a first trigger frame that initiates the UL MU simultaneous transmission, wherein the trigger frame includes (1) a UL MU Physical Layer Convergence Protocol (PLCP) Protocol Data Unit (PPDU) attributes field to indicate attributes pertaining to a UL MU PPDU transmitted to the AP during the UL MU simultaneous transmission that are common to a plurality of stations (STAs) that are to participate in the UL MU simultaneous transmission and (2) a STA Physical Layer Service Data Unit (PSDU) attributes field for a particular STA from the plurality of STAs to indicate attributes pertaining to the UL MU PPDU that are specific to the particular STA, wherein the UL MU PPDU attributes field includes a cascade trigger subfield to indicate whether a second trigger frame is scheduled to be transmitted following the first trigger frame and during a designated period, and wherein the STA PSDU attributes field for the particular STA includes an assignment subfield to indicate a transmission resource unit that the particular STA is to use to transmit a set of Media Access Control (MAC) Protocol Data Units (MPDUs) within the UL MU PPDU to the AP during the UL MU simultaneous transmission; and transmitting the first trigger frame through a wireless medium.

2. The method of claim 1, wherein a length of the cascade trigger subfield is one bit, wherein a first state of the one bit indicates that the second trigger frame is to be transmitted in the designated period, and wherein a second state of the one bit indicates that the second trigger frame is not to be transmitted in the designated period.

3. The method of claim 2, wherein when the cascade trigger subfield is set to the first state an additional field is to be used in the first trigger frame to assist in responding to one or more of the first trigger frame and the second trigger frame, which allow for random access transmissions.

4. The method of claim 1, wherein the UL MU PPDU attributes field further includes a bandwidth subfield to indicate a bandwidth of the UL MU PPDU.

5. The method of claim 1, wherein the UL MU PPDU attributes field further includes a duration subfield to indicate a length of the UL MU PPDU.

6. The method of claim 1, wherein the STA PSDU attributes field for the particular STA includes a modulation and coding scheme (MCS) subfield to indicate an MCS level that the particular STA is to use for one or more portions of the UL MU PPDU.

7. The method of claim 1, wherein the STA PSDU attributes field for the particular STA further includes a STA identifier subfield to indicate an association identifier that identifies the particular STA.

8. The method of claim 1, wherein the STA PSDU attributes field further includes a number of spatial streams subfield to indicate a number of spatial streams that the particular STA is to use to transmit the UL MU PPDU to the AP during the UL MU simultaneous transmission, wherein the UL MU PPDU attributes field further includes a field that indicates information for generating a set of High Efficiency (HE) Long Training Field (LTF) symbols in the UL MU PPDU.

9. The method of claim 1, wherein a station that receives the first trigger frame determines whether to enter a doze state based on the cascade trigger subfield.

10. A method implemented by a station (STA) in a Wireless Local Area Network (WLAN) to participate in an uplink (UL) multi-user (MU) simultaneous transmission to an access point (AP) with one or more other STAs, the method comprising:
receiving a first trigger frame that initiates the UL MU simultaneous transmission from the AP, wherein the trigger frame includes (1) a UL MU Physical Layer Convergence Protocol (PLCP) Protocol Data Unit (PPDU) attributes field to indicate attributes pertaining to a UL MU PPDU transmitted to the AP during the UL MU simultaneous transmission that are common to the STA and the one or more other STAs and (2) a STA Physical Layer Service Data Unit (PSDU) attributes field for the STA to indicate attributes pertaining to the UL MU PPDU that are specific to the STA, wherein the UL MU PPDU attributes field includes a cascade trigger subfield to indicate whether a second trigger frame is scheduled to be transmitted following the first trigger frame and during a designated period, and wherein the STA PSDU attributes field for the STA includes an assignment subfield to indicate a transmission resource unit that the STA is to use to transmit a set of Media Access Control (MAC) Protocol Data Units (MPDUs) within the UL MU PPDU to the AP during the UL MU simultaneous transmission;
determining whether the second trigger frame is scheduled to be transmitted following the first trigger frame and during the designated period; and
transmitting the UL MU PPDU to the AP through a wireless medium during the UL MU simultaneous transmission based on the first trigger frame.

11. The method of claim 10, wherein a length of the cascade trigger subfield is one bit, and wherein a first state of the one bit indicates that the second trigger frame is to be transmitted in the designated period, and wherein a second state of the one bit indicates that the second trigger frame is not to be transmitted in the designated period.

12. The method of claim 11, wherein when the cascade trigger subfield is set to the first state an additional field is to be used in the first trigger frame to assist in responding to the second trigger frame, which allow for random access transmissions.

13. The method of claim 12, further comprising:
receiving the second trigger frame from the AP; and
transmitting a response to the second trigger frame based on the additional field of the first trigger frame when the cascade trigger subfield is set to the first state.

14. The method of claim 10, wherein the UL MU PPDU attributes field further includes a duration subfield to indicate a length of the UL MU PPDU and a bandwidth subfield to indicate a bandwidth of the UL MU PPDU, the method further comprising:
determining the length of the UL MU PPDU based on an indication in the duration subfield, wherein the STA generates the UL MU PPDU such that the UL MU PPDU has the determined length of the UL MU PPDU; and
determining the bandwidth of the UL MU PPDU based on an indication in the bandwidth subfield, wherein the STA transmits the UL MU PPDU to the AP based on the determined bandwidth of the UL MU PPDU.

15. The method of claim 10, wherein the STA PSDU attributes field for the STA includes (1) a STA identifier subfield to indicate an association identifier and (2) a modulation and coding scheme (MCS) subfield to indicate an MCS level that the STA is to use for one or more portions of the UL MU PPDU, the method further comprising:
determining that the STA PSDU attributes field for the STA indicates attributes pertaining to the UL MU PPDU that are specific to the STA based on a determination that the association identifier is an association identifier associated with the STA; and
determining the MCS for the one or more portions of the UL MU PPDU based on an indication in the MCS subfield.

16. The method of claim 15, wherein the association identifier indicates that the STA PSDU attributes field is associated with random access transmissions.

17. The method of claim 10, wherein the STA PSDU attributes field further includes a spatial streams (SS) allocation subfield that indicates a number of spatial streams subfield to indicate a number of spatial streams that the STA is to use to transmit the UL MU PPDU to the AP during the UL MU simultaneous transmission and the UL MU PPDU attributes field further includes a Long Training Field (LTF) subfield that indicates information for generating a set of High Efficiency (HE) LTF symbols in the UL MU PPDU, the method further comprising:
determining the number of spatial streams that the STA is to use to transmit the UL MU PPDU to the AP during the UL MU simultaneous transmission based on an indication in the number of spatial streams subfield, wherein the STA transmits the UL MU PPDU to the AP using the determined number of spatial streams; and
generating the set of HE LTE symbols in the UL MU PPDU based on the LTF subfield.

18. The method of claim 10, further comprising:
entering a doze state based on the cascade trigger subfield of the first trigger frame.

19. A network device to function as station (STA) in a Wireless Local Area Network (WLAN) to participate in an uplink (UL) multi-user (MU) simultaneous transmission to an access point (AP), the network device comprising:
a Radio Frequency (RF) transceiver; and
a set of one or more processors, wherein the set of one or more processors are to:
process a first trigger frame that initiates the UL MU simultaneous transmission, wherein the trigger frame includes (1) a UL MU Physical Layer Convergence Protocol (PLCP) Protocol Data Unit (PPDU) attributes field to indicate attributes pertaining to a UL MU PPDU transmitted to the AP during the UL MU simultaneous transmission that are common to the STA and one or more other STAs and (2) a STA Physical Layer Service Data Unit (PSDU) attributes field for the STA to indicate attributes pertaining to the UL MU PPDU that are specific to the STA, wherein the UL MU PPDU attributes field includes a cascade trigger subfield to indicate whether a second trigger frame is scheduled to be transmitted following the first trigger frame and during a designated period, and wherein the STA PSDU attributes field for the STA includes an assignment subfield to indicate a transmission resource unit that the STA is to use to transmit a set of Media Access Control (MAC) Protocol Data Units (MPDUs) within the UL MU PPDU to the AP during the UL MU simultaneous transmission, determine whether the second trigger frame is scheduled to be transmitted following the first trigger frame and during the designated period, and generate the UL MU PPDU for transmission to the AP through a wireless medium during the UL MU simultaneous transmission based on the first trigger frame.

20. The network device of claim 19, wherein a length of the cascade trigger subfield is one bit, and wherein a first state of the one bit indicates that the second trigger frame is to be transmitted in the designated period, and wherein a second state of the one bit indicates that the second trigger frame is not to be transmitted in the designated period, and wherein when the cascade trigger subfield is set to the first state an additional field is to be used in the first trigger frame to assist in responding to the second trigger frame, which allow for random access transmissions, wherein when the cascade trigger subfield is set to the first state, the set of one or more processors are to:
receive the second trigger frame from the AP, and
transmit a response to the second trigger frame based on the additional field of the first trigger frame when the cascade trigger subfield is set to the first state, and wherein when the cascade trigger subfield is set to the second state, the set of one or more processors are to:
cause the network device to enter a doze state.

\* \* \* \* \*